(12) United States Patent
Sorin et al.

(10) Patent No.: US 6,788,845 B1
(45) Date of Patent: Sep. 7, 2004

(54) METHODS AND APPARATUSES TO PROVIDE A TUNABLE CHROMATIC DISPERSION COMPENSATOR

(75) Inventors: Wayne V. Sorin, Mountain View, CA (US); Byoung Yoon Kim, Mountain View, CA (US); Ben Vakoc, Palo Alto, CA (US)

(73) Assignee: Novera Optics, Inc., Palo Alto, CA (US)

( * ) Notice: Subject to any disclaimer, the term of this patent is extended or adjusted under 35 U.S.C. 154(b) by 105 days.

(21) Appl. No.: 10/159,544

(22) Filed: May 31, 2002

(51) Int. Cl.[7] ................................................. G02B 6/26
(52) U.S. Cl. ........................... 385/27; 385/33; 385/36; 385/43
(58) Field of Search ..................... 385/16–24, 27, 385/33, 36, 37, 43

(56) References Cited

U.S. PATENT DOCUMENTS

| | | | |
|---|---|---|---|
| 4,828,350 A | 5/1989 | Kim et al. | |
| 5,204,771 A | 4/1993 | Koga | 359/281 |
| 5,611,004 A | 3/1997 | Chang et al. | 385/1 |
| 6,377,391 B1 | 4/2002 | Vakoc et al. | 359/337.1 |
| 6,614,958 B1 * | 9/2003 | Schmidt | 385/33 |

FOREIGN PATENT DOCUMENTS

WO    WO 99/49342 A1    11/1999

OTHER PUBLICATIONS

D. Ostling and H.E. Engan, "Polarization–selective mode coupling in two–mode Hi–Bi fibers," Journal of Lightwave Technology, vol. 15, No. 2, pp. 312–320 (Feb. 1997).

W.P. Risk, G.S. Kino, and B.T. Khuri–Yakub, "Tunable optical filter in fiber–optic form," Optics Letters, vol. 11, No. 9, pp. 578–580 (Sep. 1986).

D.O. Culverhouse, et al., "All–fibre Acousto–optic Tunable Filter Based on a Null Coupler," Optical Communication 1996, ECOC '96, vol. 3, pp. 317–320 (Sep. 15–19, 1996).

H.Y. Rhy, et al., "Self–Switching with a Nonlinear Birefringent Loop Mirror," IEEE Journal of Quantum Electronics, vol. 36, No. 1, pp. 89–93 (Jan. 2000).

B. Crosignani et al., "Kerr Effect and Chromatic Dispersion in Fiber–Optic Gyroscopes", Journal of Lightwave Technology, vol. LT–3, No. 4, (A Joint IEEE/OSA Publicaton, Aug. 1985, pp. 914–918.

C. Balslev Clausen et al., "Polarization Sensitivity of the Nonlinear Amplifying Loop Mirror", A Publication of the Optical Society of America, Optics Letters, vol. 21, No. 19, Oct., 1996, pp. 1535–1537.

(List continued on next page.)

*Primary Examiner*—Phan T. H. Palmer
(74) *Attorney, Agent, or Firm*—Blakely, Sokoloff, Taylor & Zafman LLP

(57) ABSTRACT

Various methods, systems and apparatuses in which a chromatic dispersion compensation module includes an input fiber, an output fiber, a lens, and an etalon resonator. The input fiber has a first core with a center. The output fiber has a second core with a center. The input fiber is adjacent to the output fiber. The spacing between the center of the first core and the center of the second core is affixed to less than one hundred and twenty microns. The input fiber routes an optical signal to lens. The lens routes the optical signal to the etalon resonator. The etalon resonator has reflectors with fixed reflectivity and a variable optical length to induce a wavelength-dependent delay into the optical signal. The a etalon resonator routes the optical signal to the output fiber through the lens.

31 Claims, 15 Drawing Sheets

OTHER PUBLICATIONS

E. Dowling et al., "Lightwave Lattice Filters for Optically Multiplexed Communication Systems", Journal of Lightwave Technology, vol. 12, No. 3, Mar. 1994, pp. 471–486.

D.L. MacFarlane et al., "Three–Mirror Etalons as Bandpass Filters for Modulated Optical Signals", IEEE Photonics Technology Letters, vol. 5, No. 9, Sep. 1993, pp. 1089–1092.

G. Lenz et al., "Dispersive Properties of Optical Filters for WDM Systems", IEEE Journal of QuantumElectronics, vol. 34, No. 8, Aug. 1998, pp. 1390–1402.

C.K. Madsen et al., "An All–Pass Filter Dispersion Compensator using Planar Waveguide Ring Resonators", Bell Laboratories, Lucent Technologies, Room 1D148, 600 Mountain Avenue, Murray Hill NJ 07974, pp. FE6–1/99, 100/FE6–2, FE6–3/101 (3 total).

G. Lenz et al., "Optimal Dispersion of Optical Filters for WDM Systems", IEEE Photonics Technology Letters, vol. 10, No. 4, Apr. 1998, pp. 567–569.

C.K. Madsen et al., "Phase Engineering Applied to Integrated Optical Filters", IEEE 1999, Bell Laboratories, Lucent Technologies, Room 1D148, 600 Mountain Avenue, Murray Hill NJ 07974, pp. 906–907.

C.K. Madsen et al., "A Multi–Channel Dispersion Slope Compensating Optical Allpass Filter", Bell Laboratories, Lucent Technologies, Room 1D148, 600 Mountain Avenue, Murray Hill NJ 07974, pp. 94/WF5–1, WF5–2/9, 96/WF5–3 (3 total).

C.K. Madsen, "General IIR Optical Filter Design for WDM Applications Using All–Pass Filters", Journal of Lightwave Technology, vol. 18, No. 6, Jun. 2000, pp. 860–868.

C.K. Madsen et al., "A Tunable Dispersion Compensating MEMS All–Pass Filter", IEEE Photonics Technology Letters, vol. 12, No. 6, Jun. 2000, pp. 651–653.

A.H. Gnauck et al., "Optical Equalization of Fiber Chromatic Dispersion in a 5–Gb/s Transmission System", IEEE Photonics Technology Letters, vol. 2, No. 8, Aug. 1990, pp. 585–587.

G. Lenz et al., "Optical Delay Lines Based on Optical Filters", IEEE Journal of Quantum Electronics, vol. 37, No. 4 Apr. 2001, pp. 525–532.

G. Lenz et al., "General Optical All–Pass Filter Structures for Dispersion Control in WDM Systems", Journal of Lightwave Technology, vol. 17, No. 7, Jul. 1999, pp. 1248–1254.

C.K. Madsen, "A Multiport Frequency Band Selector with Inherently Low Loss, Flat Passbands, and Low Crosstalk", IEEE Photonics Technology Letters, vol. 10, No. 12, Dec. 1998, pp. 1766–1768.

C.K. Madsen, "Efficient Architectures for Exactly Realizing Optical Filters with Optimum Bandpass Designs", IEEE Photonics Technology Letters, vol. 10, No. 8, Aug. 1998, pp. 1136–1138.

C.K. Madsen et al., "Optical All Pass Filters for Phase Response Design with Applications for Dispersion Compensation", IEEE Photonics Technology Letters, vol. 10, No. 7, Jul. 1998, pp. 994–996.

C.K. Madsen et al., "Integrated All–Pass Filters for Tunable Dispersion and Dispersion Slope Compensation", IEEE Photonics Technology Letters, vol. 11, No. 12, Dec. 1999, pp. 1623–1625.

Koichi Takiguchi et al., "Dispersion Compensation Using a Planar Lightwave Circuit Optical Equalizer", IEEE Photonics Technology Letters, vol. 6, No. 4, Apr. 1994, pp. 561–564.

Christi K. Madsen et al., "Increasing the Free Spectral Range of Silica Waveguide Rings for Filter Applications", Optics Letters/vol. 23, No. 3/Feb. 1998, pp. 186–188.

C.K. Madsen et al., "Compact Integrated Tunable Chromatic Dispersion Compensator with a 4000 ps/nm Tuning Range", Bell Laboratories, Lucent Technologies, 6000 Mountain Avenue, Murray Hill, NJ 07974, pp. PD9–1PD9–3.

Tetsuro Komukai et al., "The Design of Dispersion Equalizers Using Chirped Fiber Bragg Gratings", IEEE Journal of Quantum Electronics, vol. 36, No. 4, Apr. 2000, pp. 409–417.

Masataka Shirasaki, "Virtually Imaged Phased Array", Manuscript, Fujitsu Sci. Tech J., 35, 1, pp. 113–125 (Jul. 1999).

K. Ennser et al., "Influence of Nonideal Chirped Fiber Grating Characteristics on Dispersion Cancellation", IEEE Photonics Technology Letters, vol. 10, No. 10, Oct. 1998.

D.J. Moss, et al., "Multichannel tunable dispersion compensation using all–pass multicavity etalons," OFC 2002 (Mar. 19, 2002).

* cited by examiner

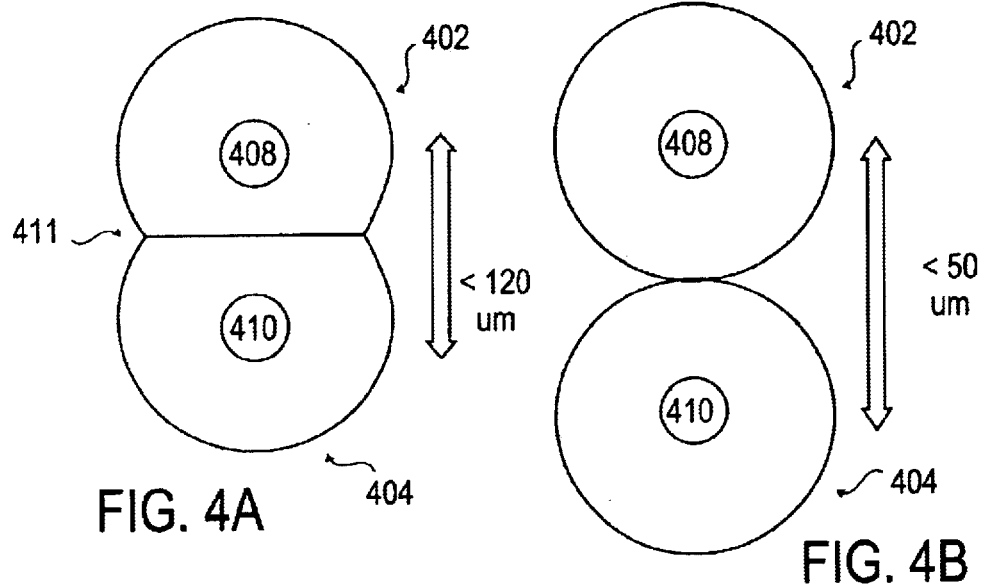
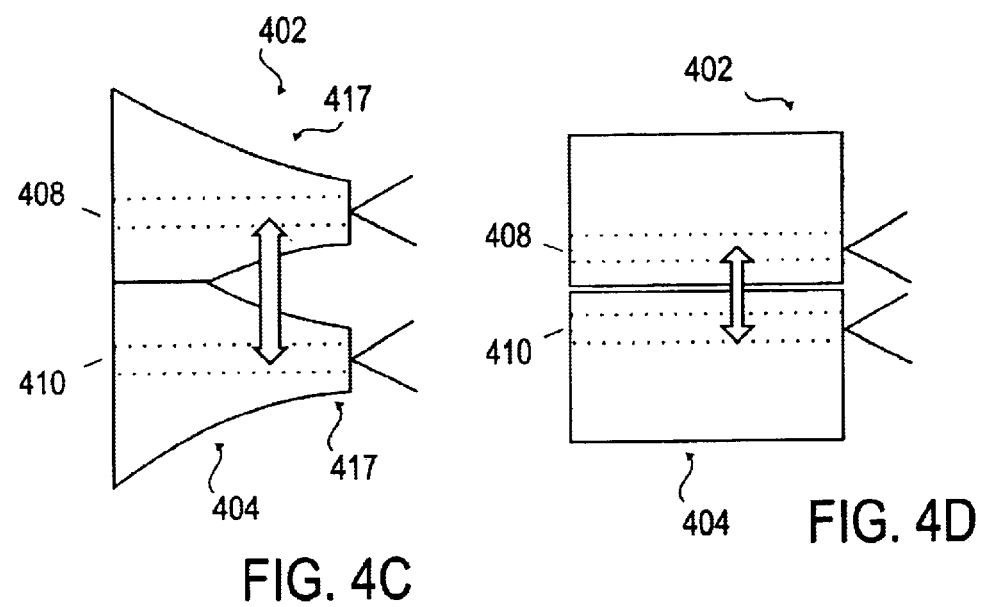

METHODS AND APPARATUSES TO PROVIDE A TUNABLE CHROMATIC DISPERSION COMPENSATOR

FIELD

Embodiments of this invention relate to tunable chromatic dispersion compensation devices. More particularly, embodiments relate to tunable chromatic dispersion compensator using dual fibers having a given spacing between their cores.

BACKGROUND

A single narrow pulse of light may consist of many wavelengths in a given passband entering a fiber optic transmission system. During the travels through the fiber optic transmission system that single narrow pulse of light becomes dispersed, separated in time, due to effects of chromatic dispersion. Therefore, a chromatic dispersion module's overall goal is usually to delay wavelengths in a given passband enough to combine all the wavelengths in the passband into a single narrow pulse.

Chromatic dispersion is pulse spreading arising from differences in the speed that light of different wavelengths travel through a material, such as fiber optic cable. Chromatic dispersion is the variation in the propagation speed of light as a function of wavelength. Chromatic dispersion causes a distortion of the optical pulses that propagate through a fiber optic transmission line. As noted, to compensate for the chromatic dispersion in the fiber spans, chromatic dispersion compensating modules (DCMs) are placed periodically in the transmission line. Chromatic dispersion compensating modules add dispersion to the signal, which is ideally equal and opposite in sign, to counteract the dispersion accumulated in the fiber span. The pulses are then reformed to counteract and eliminate the chromatic dispersion-induced distortion within a passband of wavelengths.

In prior technologies, all-pass filters have been tried in dispersion compensation devices. FIG. 1 illustrates a block diagram of a prior art basic etalon-type all-pass filter. The backside mirror has 100% reflector while the front side mirror can have a reflectivity less than 100%. The term all-pass means that no fundamental sources of loss in the device exist, and thus, the theoretical amplitude response equals unity at all wavelengths. The etalon-type all-pass filter therefore only affects the phase of the light. Because dispersion is a change in the phase of the light, this type of filter is well suited to chromatic dispersion compensation.

In FIG. 1, the light travels into the basic etalon-type all-pass filter. A combined input/output fiber sends an optical signal into a collimating lens. The light is collimated and sent at normal incidence into the basic etalon-type all-pass filter. The basic etalon-type all-pass filter produces a variation in the time delay due to the resonate circulation of some wavelengths within the cavity. For wavelengths that are at resonance, the light effectively stays inside the cavity longer than for wavelengths that are off resonance. This causes a wavelength-dependent delay that produces dispersion. Light traveling out of the fiber eventually returns to the collimating lens. However, these basic etalon-type all-pass filter may have unacceptable high amount of insertion loss. Insertion loss is measured by the strength of the optical signal coming out of the all-pass filter as compared to the strength of the optical signal entering the all-pass filter.

Another previous technique of trying to compensate for dispersion compensation was to add a dispersion compensation fiber to a group of optical amplifiers. However, the dispersion compensation fiber was not really adjustable in length or amount of dispersion, and also incurred heavy insertion losses. The heavy insertion losses were some of the non-beneficial effects of adding the dispersion compensation fibers to the system.

Another previous parameter of trying to compensate for dispersion compensation to make the device temperature independent or maintain a temperature so that the variable of temperature does not effect the operation of the device. However, in some cases it might be advantageous to take advantage of temperatures affect on the refractive index of optical components.

Also, most of the above devices are able to tune the dispersion compensation while maintaining a constant dispersion slope. However, in order to compensate for the dispersion of arbitrary fibers, or arbitrary combinations of fibers, a dispersion compensation device that cannot adjust the dispersion and dispersion slope independently may be inadequate.

SUMMARY

Various methods, systems, and apparatuses are described. For example, a chromatic dispersion compensation module includes an input fiber, an output fiber, a lens, and an etalon resonator. The input fiber has a first core with a center. The output fiber has a second core with a center. The input fiber is adjacent to the output fiber. The spacing between the center of the first core and the center of the second core is affixed to less than one hundred and twenty microns. The input fiber routes an optical signal to a lens. The lens routes the optical signal to the etalon resonator. The etalon resonator has reflectors with fixed reflectivity and a variable optical length to induce a wavelength-dependent delay into the optical signal. The etalon resonator routes the optical signal to the output fiber through the lens.

A chromatic dispersion compensation module that includes an input fiber, an output fiber, a lens, and a first etalon is described. The input fiber is adjacent to the output fiber. The input fiber routes an optical signal to the lens. The first etalon resonator has reflectors with wavelength-dependent reflectivity and a variable optical length to induce a wavelength-dependent delay into the optical signal. The lens routes the optical signal to the first etalon resonator. The first etalon resonator routes the optical signal to the output fiber through the lens. A temperature control device affixes to the first etalon resonator. The temperature control device controls temperature of the first etalon resonator independent of any other etalon resonator.

A method of inducing wavelength-dependent delays in to an optical signal is described. The optical signal is collimated. The optical signal is routed to an etalon resonator. The resonant center wavelength of the etalon resonator is tuned by adjusting optical path length of the etalon resonator. The optical signal is routed, via a non-normal angle of incidence, to an output. The non-normal angle of incidence incurs a figure of merit of less than two tenths.

A tunable chromatic dispersion compensation module that includes a first set of etalons and a second set of etalons is described. The first set of etalons has a Free Spectral Range equal to a first value. The first set of etalons creates a dispersion over a first passband of optical wavelengths. The second set of etalons has a Free Spectral Range offset from the first value and a second passband of optical wavelengths that is greater in bandwidth than the band of optical wavelengths in the first passband. The second set of etalons creates a dispersion over the second passband of optical wavelengths. The dispersion over the first passband of optical wavelengths and the dispersion over the second passband of optical wavelengths sums together.

Other features and advantages of the present invention will be apparent from the accompanying drawings and from the detailed description that follows below.

BRIEF DESCRIPTION OF THE DRAWINGS

The present invention is illustrated by example and not limitation in the figures of the accompanying drawings, in which like references indicate similar elements and in which:

FIGS. 4a, 4b, 4c, and 4d illustrate block diagrams of various embodiments of an input fiber and an output fiber having a core spacing between the centers of their cores of less than 120 microns.

A dispersion compensator that allows for the independent tuning of the dispersion and dispersion slope across a passband of optical wavelengths.

Figure 9:
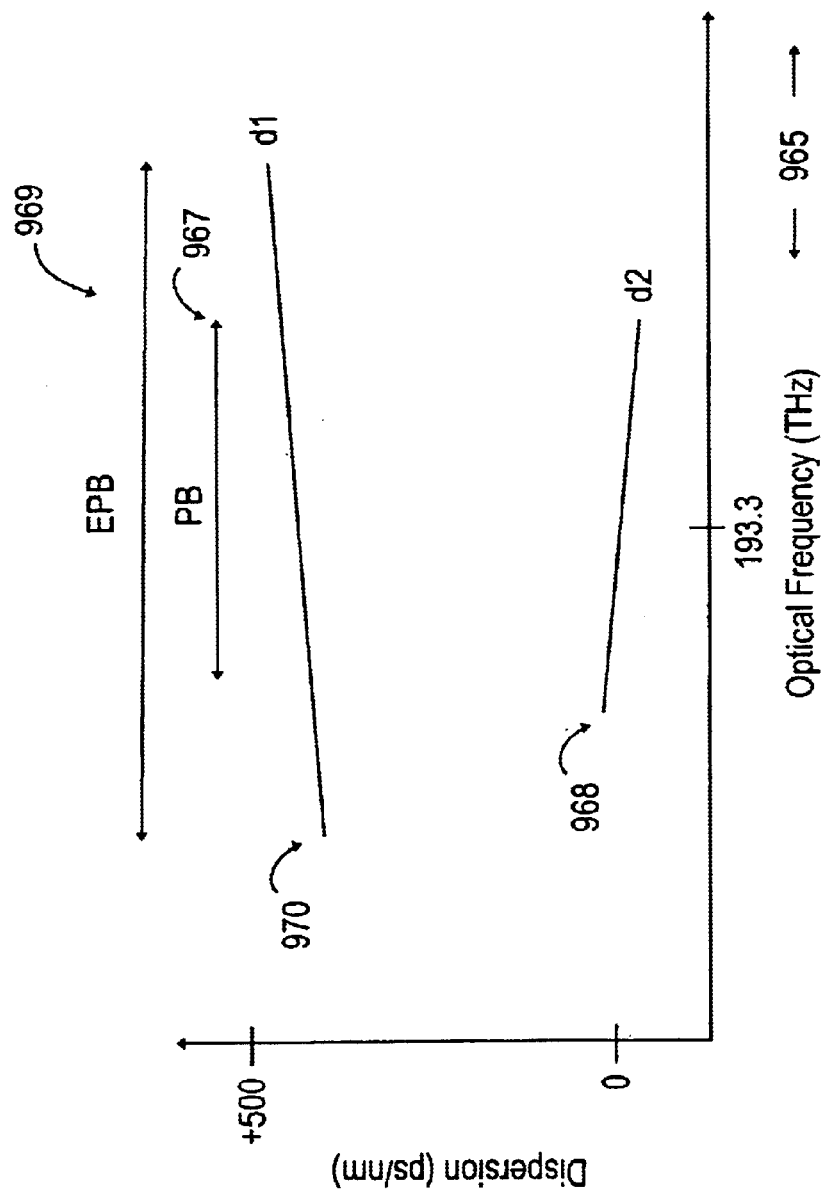

FIG. 9 illustrates a graph of an exemplary passband of wavelengths and induced dispersion compensation generated by both the first set of etalons and the second set of etalons.

Figure 10:
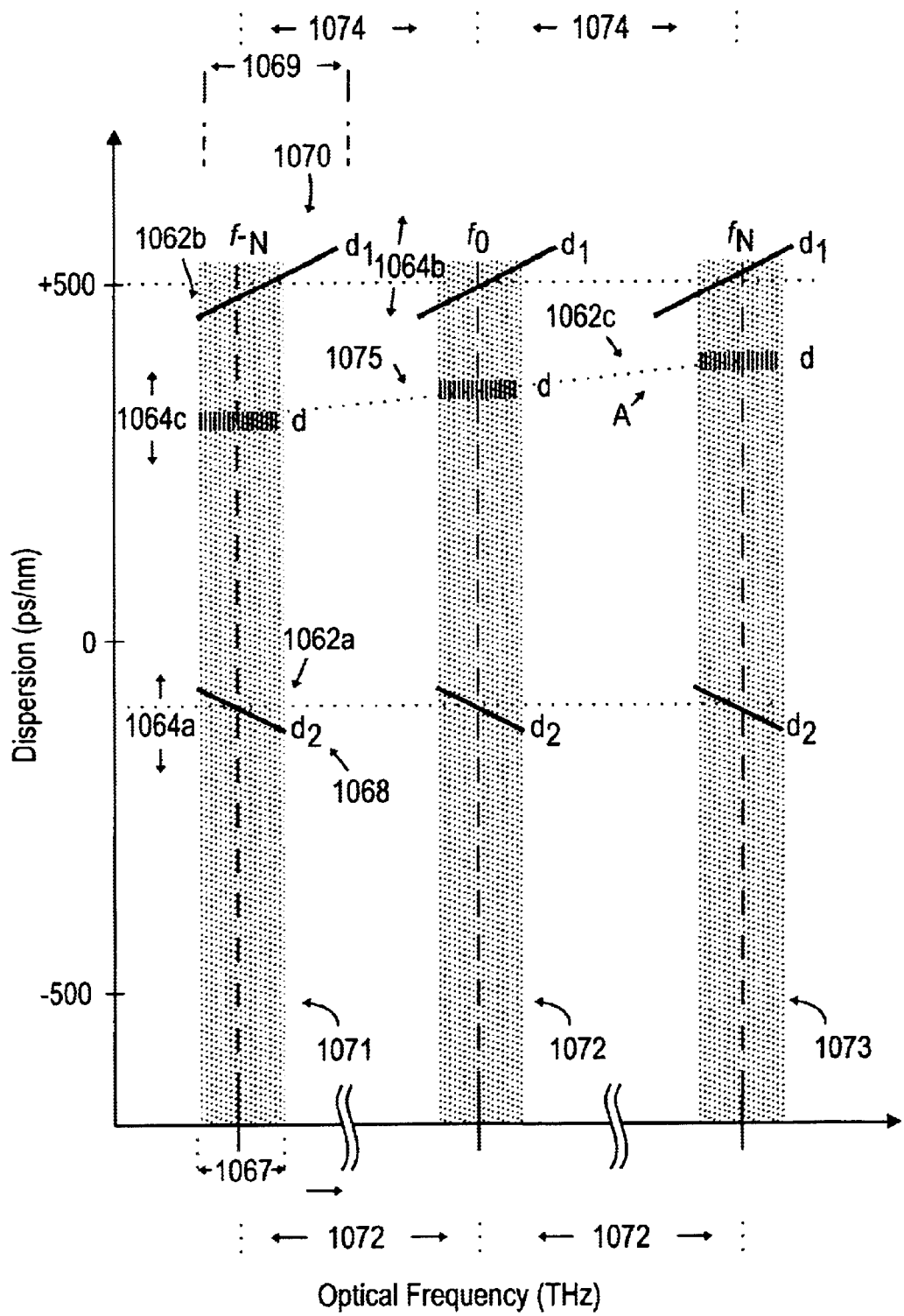

FIG. 10 illustrates a graph of two exemplary linear dispersion curves with substantially opposite slopes generated by a first set of etalons having a passband of wavelengths equal to a first bandwidth and a second set of etalons having an extended-passband greater in bandwidth than the passband.

Figure 11:
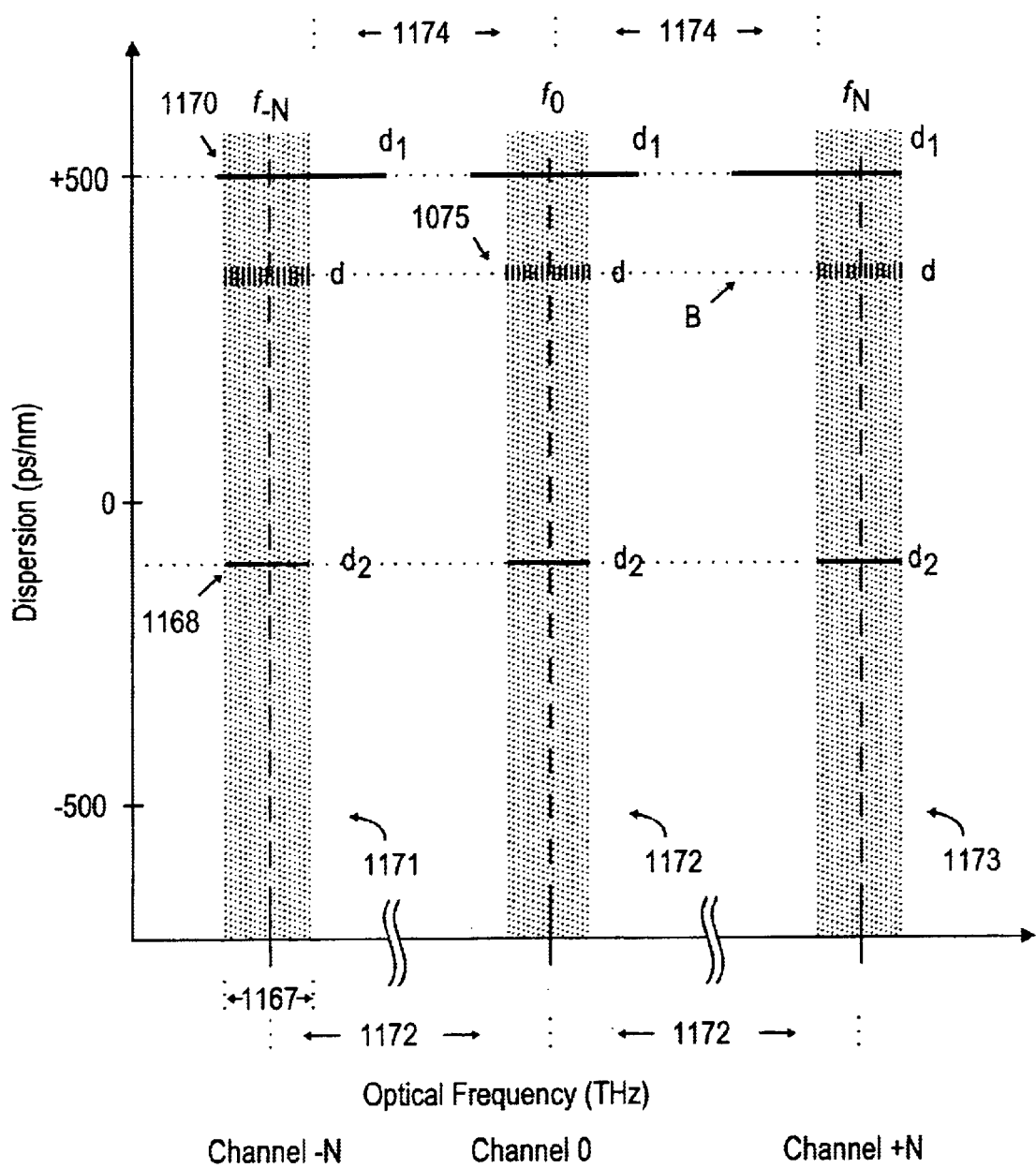

FIG. 11 illustrates a graph of an exemplary dispersion compensation versus optical frequency generated by an embodiment of a tunable chromatic dispersion compensator where the free spectral range of the second set of etalons and the first set of etalons differ but the dispersion slope is approximately zero.

Figure 12:
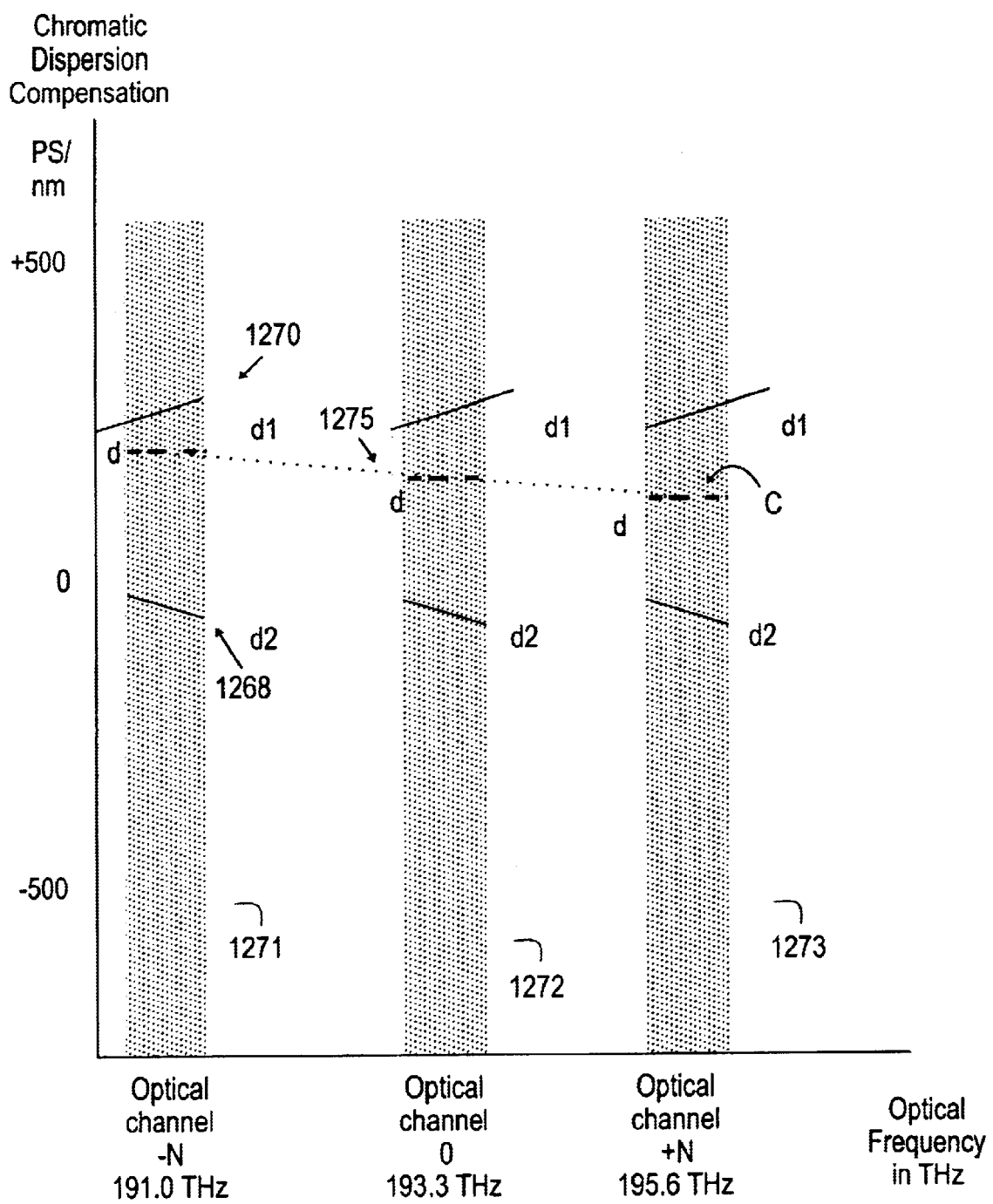

FIG. 12 illustrates a graph of exemplary dispersion curves where the second set of etalons with a Free Spectral Range has an offset value set above the first value to generate a negative slope of the dispersion compensation across the first passband.

Figure 13:
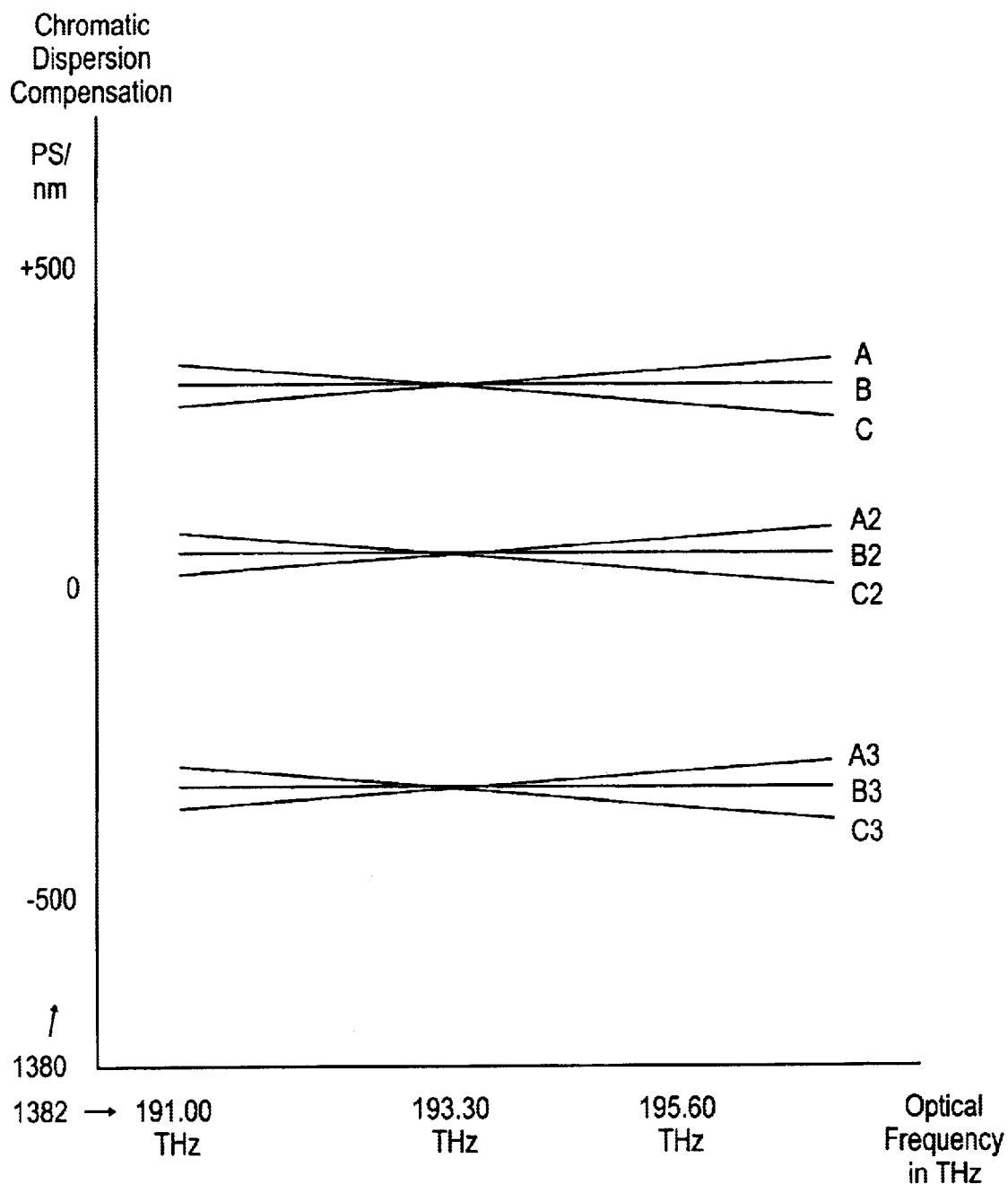

FIG. 13 illustrates a graph of an exemplary dispersion compensation versus optical frequency generated by an embodiment of a tunable chromatic dispersion compensator that allows for the independent tuning of the total amount of dispersion compensation and the slope of the dispersion across a passband of optical channels.

Figure 14:
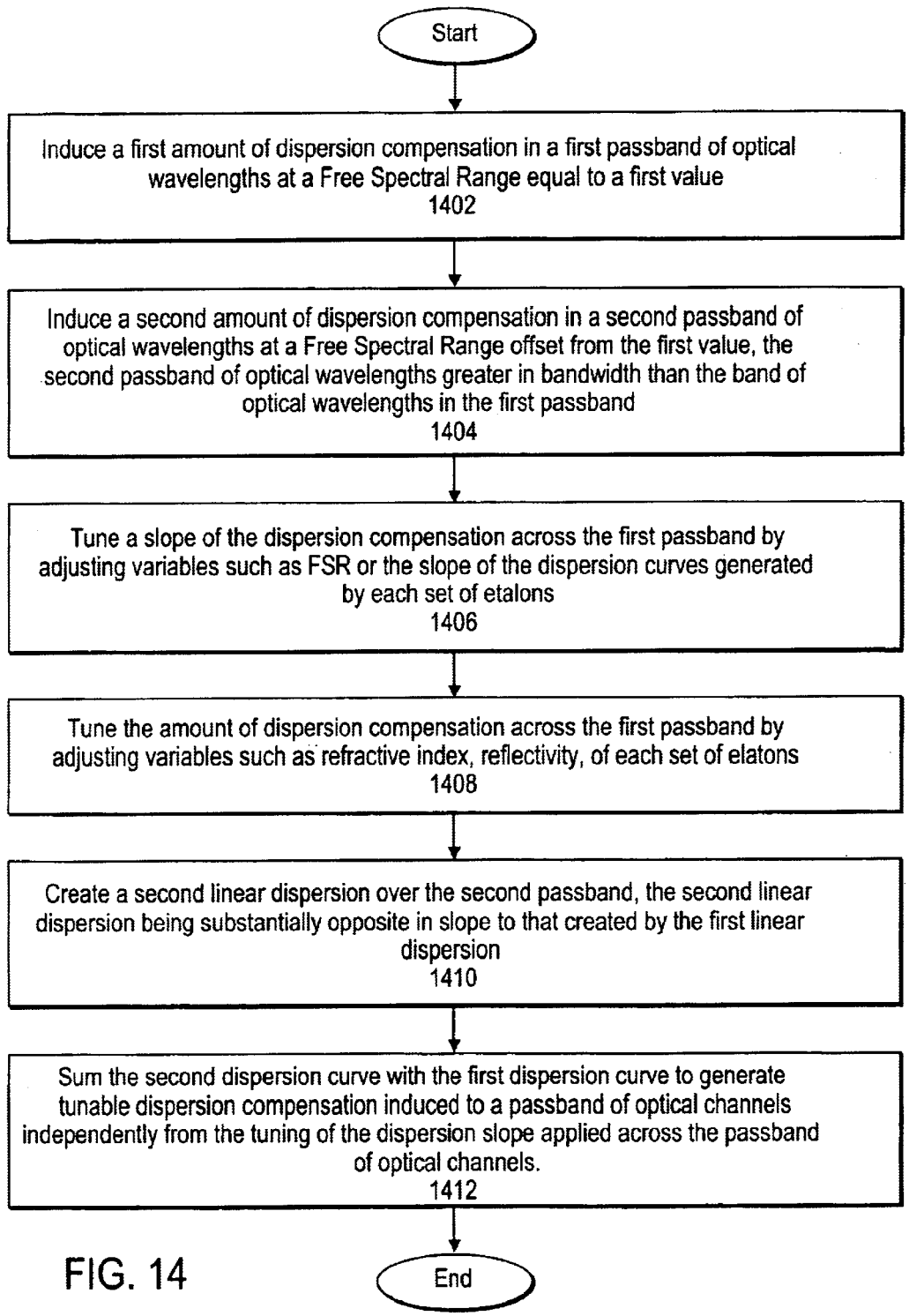

FIG. 14 illustrates a flow chart of an embodiment of a method to adjust total amount of dispersion compensation induced in an optical signal independent of the dispersion slope induced in the optical signal.

DETAILED DESCRIPTION

In general, various tunable chromatic dispersion compensation modules are described. For an embodiment, a chromatic dispersion compensation module has an input fiber and an output fiber. The input fiber has a first core with a center. The output fiber has a second core with a center. The input fiber is adjacent to the output fiber. The spacing between the center of the first core and the center of the second core is affixed to less than one hundred and twenty microns. For an embodiment, a tunable chromatic dispersion compensation module includes a first set of etalon resonators and a second set of etalon resonators to adjust the slope of the dispersion compensation across a passband of wavelengths independently from the total amount of dispersion compensation induced across the passband of wavelengths. Other features, aspects, and advantages of the present invention will be apparent from the accompanying drawings and from the detailed description that follows below.

Figure 1:
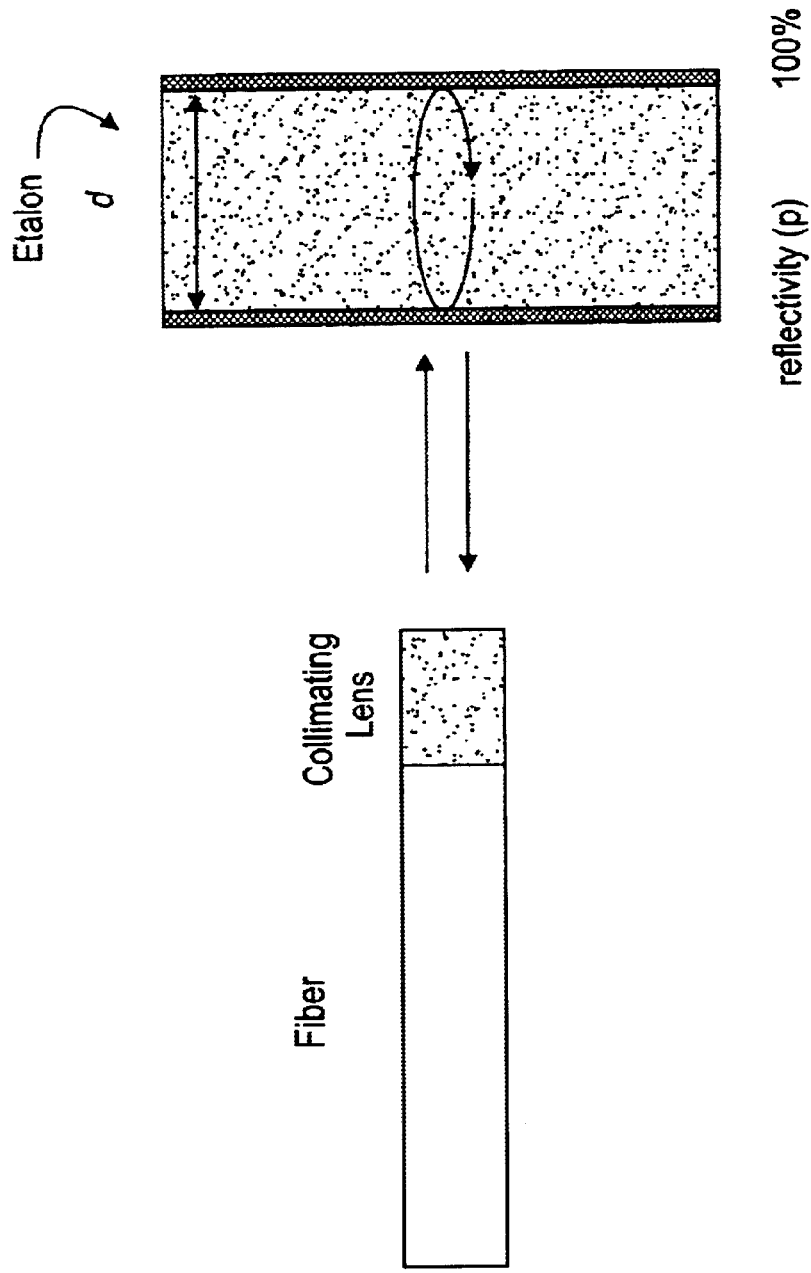
FIG. 1 illustrates a block diagram of a prior art basic etalon-type all-pass filter.
Figure 2A:
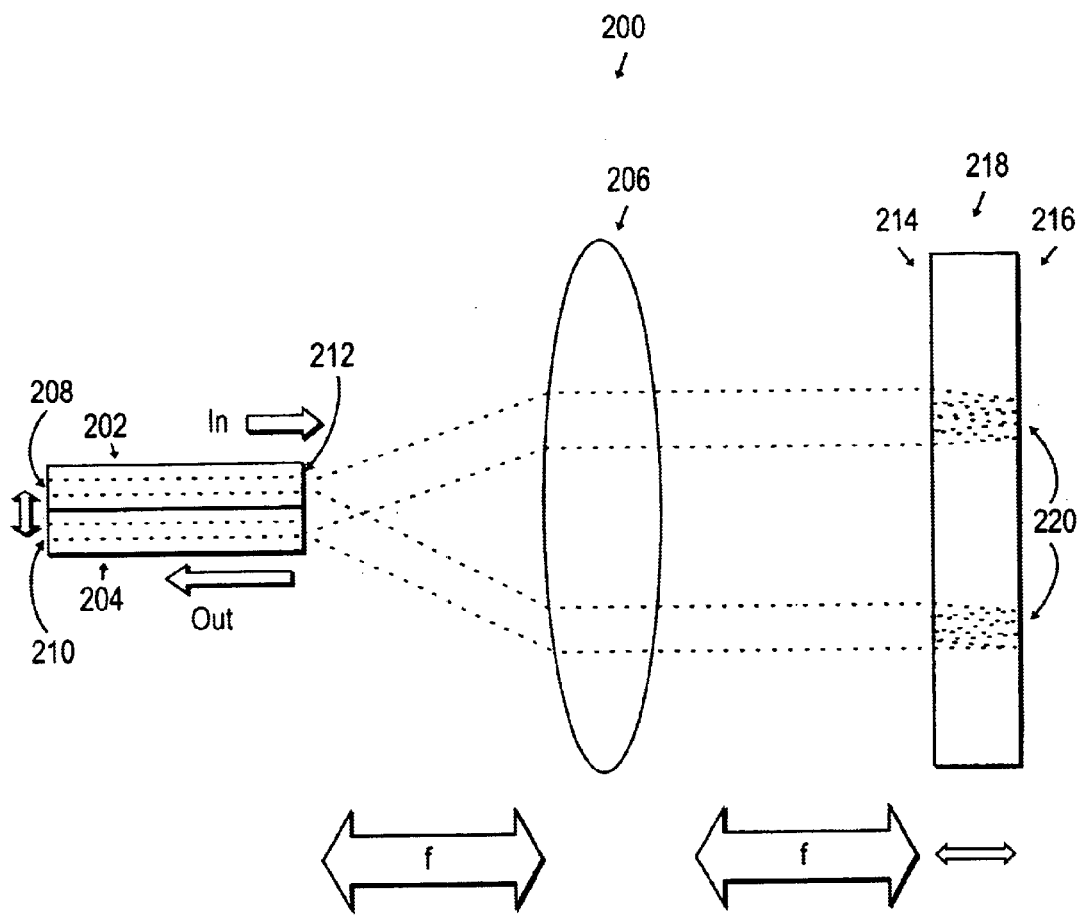
FIG. 2a illustrates a block diagram of an embodiment of a chromatic dispersion compensation module having an input fiber and an output fiber affixed together and having spacing between the centers of the cores of less than 120 microns.

FIG. 2a illustrates a block diagram of an embodiment of a chromatic dispersion compensation module having an input fiber and an output fiber affixed together and having spacing between the centers of the cores of less than 120 microns. For an embodiment, the chromatic dispersion compensation module 200 includes an input fiber 202, an output fiber 204, a lens 206, and an etalon resonator 218. The input fiber 202 has a first core 208. The output fiber 204 has a second core 210. The input fiber 202 is adjacent to the output fiber 204.

An input light signal enters the input fiber 202, the input light propagates through the first core 208 of the input fiber 202 and exits out the first core 208 of the input fiber 202. The exiting light has a particular spot diameter. The spot has a small diameter at the output of the input fiber 202. The spot diverges as it travels approximately a focal length to the lens 206. The lens 206 collimates the spot of light to make the spot a beam of collimated light. The beam of collimated light exits the lens 206 at a slight angle and travels approximately a focal length to the etalon resonator 218.

For an embodiment, the etalon resonator 218 consists of a front mirror 214 and a back mirror 216. The front mirror 214 may have a fixed percent reflectivity value set from two percent to sixty percent reflectivity. The back reflector 216 may have a reflectivity of approximately 100%. The collimated light beam enters the etalon resonator 218 and reflects multiple times between the front reflector 214 and the back reflector 216. Resonate wavelengths generally make more reflections and spend a little bit longer time in the etalon resonator 218 than non-resonate wavelengths. Thus, the basic all-pass filter etalon resonator 218 produces a variation in the time delay due to the resonate circulation of some wavelengths within the cavity. For wavelengths that are at resonance, the light effectively stays inside the cavity longer than for wavelengths that are off resonance. This causes a wavelength-dependent delay that produces dispersion. Both the magnitude of the delay, such as 20 picoseconds, and the affected center wavelength, such as 193.00 Terahertz, may be adjustably controlled by components in the etalon resonator 218. The magnitude of the delay may be referred to as the induced dispersion compensation.

Each reflection 220 of the collimated light beam is offset just slightly from another reflection of the light beam. The combined total of these reflected light-rays route back toward the lens 206. The lens 206 changes the angle of these reflected light beams to focus them back towards the input of the output fiber 204. The grouped reflected collimated light beams enter the second core 210 of the output fiber 204. The reflected spots of collimated light are all beams of light that are slightly displaced from one another.

Figure 2B:
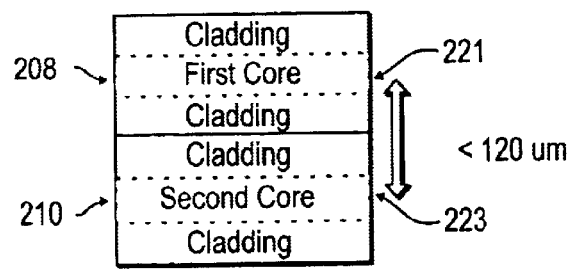
FIG. 2b illustrates a block diagram of an embodiment of an input fiber and an output fiber having spacing between the center of their cores affixed to less than one hundred and twenty microns.

FIG. 2b illustrates a block diagram of an embodiment of an input fiber and an output fiber having spacing between the center of their cores affixed to less than one hundred and twenty microns. The input fiber 202 has a first core 208 and a center of that core 221. The output fiber 204 has a second core 210 and a center 223. The input fiber 202 is adjacent to the output fiber 204. The spacing between the center of the first core 221 and the center of the second core 223 is mechanically affixed to less than 120 micron spacing apart.

For an embodiment, a chromatic dispersion compensation module 200 having a shorter distance between the spacing of the center of the cores 221, 223 will have a lower figure of merit. For an embodiment, the figure of merit is essentially a measure of the ratio of the amount of insertion loss to the amount of dispersion compensation. Thus, a lower figure of merit means a lower measurable insertion loss for a given amount of dispersion compensation induced. The spacing between the center of the first core 221 and the center of the second core 223 is affixed to any value between the range of fifty to one hundred and twenty microns.

Referring to FIG. 2a, for an embodiment the optical length, i.e. optical thickness of the etalon resonator 218, may be variable. This allows the resonant center wavelength of the etalon cavity to be tuned. Many factors may affect the variable optical length such as strain on the substrate in between the front reflector 214 and the back reflector 216, air gap spacing between the front reflector 214 and the back reflector 216, refractive index of the material between the front reflector 214 and the back reflector 216, as well as other methods to vary the optical length.

The variable optical path of the etalon resonator 218 is tuned to a center wavelength by solely changing temperature of that etalon resonator 218. For an embodiment, the variable optical path of the etalon resonator 218 is tuned to a center wavelength by solely changing strain on the substrate material between front reflector 214 and back reflector 216. For an embodiment, the variable optical path of the etalon resonator 218 is tuned to a center wavelength by solely changing the air gap spacing between the front reflector 214 and the back reflector 216. For an embodiment, the sole adjustment is the spacing between the front reflector 214 and back reflector 216 may be mechanically lengthened or shortened. For an embodiment, the optical path length of the etalon resonator 218 is adjusted while the fixed reflectivity of reflectors in that etalon resonator 218 is maintained.

The etalon resonator 218 may include reflectors 214, 216 that have wavelength dependent reflectivity such as fiber Bragg gratings, mirrors having wavelength dependant dielectric layers, or other similar components. For an embodiment, the etalon resonator 218 is an all pass etalon resonator 218 allowing every wavelength coming in with the collimated light beam exiting the lens 206 to pass through the resonator and be reflected back towards the lens 206. For an embodiment, the collimating lens 206 is a Selfoc Lens, Aspheric Lens, or similar lens.

A series of chromatic dispersion compensation modules 200 are cascadedly connected together and the dispersion compensation for all the wavelengths traveling through each chromatic dispersion compensation module 200 is summed together to provide a group dispersion compensation. Note, since the resonant wavelengths spend a little bit more time in an etalon resonator 218 that is tuned to that resonant wavelength, that resonant wavelength will receive a little bit greater delay than non-resonant wavelengths. However, the next chromatic dispersion compensation module 200 in the series line of modules may be tuned to a different resonant wavelength. Thus, in that chromatic dispersion compensation module 200, the previously resonant wavelength may only reflect once or twice in the etalon resonator 218. Therefore, the wavelength resonant in the first chromatic dispersion compensation module 200 may receive, for example, 10 picoseconds of dispersion compensation and the same wavelength not resonant in the second chromatic dispersion compensation module 200 may receive, for example, 2 picoseconds of dispersion compensation. Thus, the delay or dispersion compensation induced into each wavelength in the optical signal is dependent upon the center resonant wavelength of the etalon chamber of the chromatic dispersion compensation module 200. Note, the total dispersion compensation to that wavelength would be 12 picoseconds.

Figure 3A:
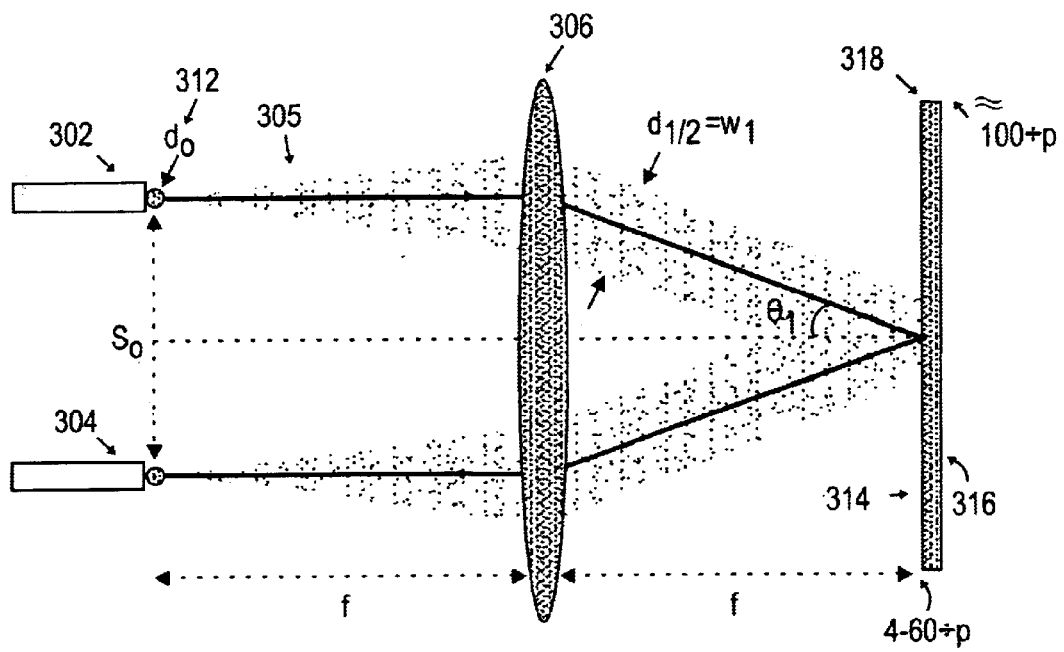
FIG. 3a illustrates a block diagram of an embodiment of a chromatic dispersion compensation module routing the optical signal at a non-normal angle of incidence to the etalon resonator.

FIG. 3a illustrates a block diagram of an embodiment of a chromatic dispersion compensation module routing the optical signal at a non-normal angle of incidence to the etalon resonator. The beam 305 exits the output of the input fiber 302. The spot diameter 312 of the light exiting the first input fiber 302 diverges and spreads to a much wider diameter as it strikes the lens 306. The light signal travels through the lens 306 and the lens 306 changes the angle of reflection slightly to route the light signal at a non-normal angle of incidence toward the etalon resonator 318. FIG. 3a shows an exemplary exaggerated non-normal angle shift. The collimated beam strikes the front reflector 314 portion of the etalon chamber. The multiple wavelengths within the collimated optical signal reflect back and forth with the resonant wavelengths having more reflections back and forth between the front reflector 314 and the back reflector 316.

Figure 3B:
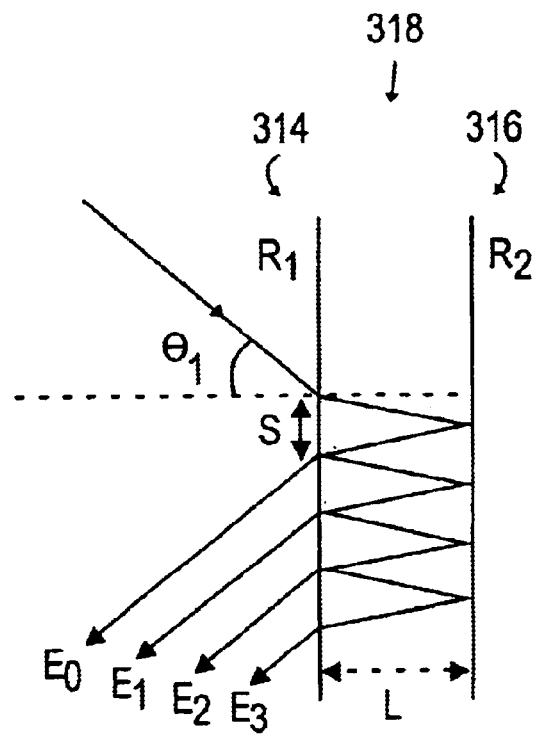
FIG. 3b illustrates block diagram of an exemplary group of beams reflecting out of an embodiment of the etalon chamber where each reflected beam has a center offset from the center of the other beams by an average distance of S.

FIG. 3b illustrates block diagram of an exemplary group of beams reflecting out of an embodiment of the etalon chamber where each reflected beam has a center offset from the center of the other beams by an average distance of S. The light signal enters the etalon resonator 318 and reflects multiple times. Each time a particular wavelength reflects back and forth between the front reflector 314 and the back reflector 316 that wavelength incurs more delay or more chromatic dispersion. Eventually, for example, four reflected beams of light can exit the etalon. The center of each reflected beam being spaced, i.e. offset, an average distance of S. The tour reflected beams of light are E0, E1, E2, and E3.

Referring to FIG. 3a, the group of reflected beams then route back to the lens 306. The lens 306 then focuses the group of reflected beams back to the input of the output fiber 304.

Note, the diameter of collimated beam striking the etalon ($d_1$) is two times the radius of the beam ($w_1$). The radius of the spot at the output of the input fiber ($w_0$) is one half the diameter of the spot ($d_0$).

For an embodiment, the figure of merit comprises: $S/w_1$ wherein the average offset of the centers of the reflected spots (S) is divided by the radius of the collimated optical signal entering the etalon ($w_1$).

For an embodiment, the figure of merit comprises:

$$[(\Pi * L/\lambda * \eta) * (S_0\, w_0/f^2)]$$

wherein the first sum of product of pie ($\Pi$) times etalon cavity physical length (L) divided by the sum of optical signal wavelength ($\lambda$) times etalon cavity refractive index ($\eta$) times the second sum of distance between the center of the first core of the input fiber 302 and the center of the second core of the output fiber 304 ($S_0$) times the radius of the spot at the output of the input fiber 302 ($w_0$) divided by the focal length of the lens (f) squared.

For an embodiment, the chromatic dispersion compensation module 300 may have a figure of merit between 0.2 and 0.01. For an embodiment, the chromatic dispersion compensation module 300 may reduce the figure of merit to the smallest manufacturable value. For an embodiment, the chromatic dispersion compensation module may minimize the peak to peak variation in the insertion losses.

Thus, as the formulas indicate if the spacing of the centers of the reflective beams can be maintained to a smaller value then a smaller figure of merit will occur. The smaller the figure of merit, the better performance and less insertion loss that the optical signal incurs by traveling through the chromatic dispersion compensation module 300 while incurring chromatic dispersion. Also, as illustrated by the formulas, the closer the spacing ($S_0$) between the core centers of the input fiber 302 and the output fiber 304 cause a lower figure of merit. The smaller the figure of merit for the chromatic dispersion compensation module 300, the smaller the insertion loss that the light signal incurs while being chromatically compensated.

Figure 3C:
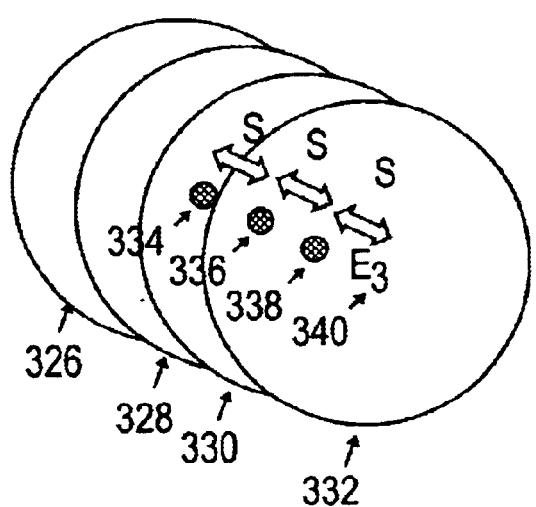
FIG. 3c shows cross-sectional views of the four exemplary reflected beams illustrated in FIG. 3b.

FIG. 3c shows cross-sectional views of the four exemplary reflected beams illustrated in FIG. 3b. The first reflected beam-E0 326 has a first center 334. The second reflected beam-E1 328 has a second center 336. The third reflected beam-E2 330 has a third center 338. The fourth reflected beam-E3 332 has a fourth center 340. Each center 334–340 of the reflected beams is spaced, i.e. offset, by an average distance of approximately S. The combined light due to the overlapping of each reflective spot 326–332 that is reflected back through the lens 306 into the output fiber light is how much power the output signal obtains and keeps. The greater the overlapping and closer the spacing of each reflected beam, the higher the output power of the optical signal. The higher the output power of the optical signal compared to the original power of the input signal, the less insertion loss the optical signal incurs.

FIGS. 4a, 4b, 4c, and 4d illustrate block diagrams of various embodiments of an input fiber and an output fiber having a core spacing between the centers of their cores of less than 120 microns.

Referring to FIG. 4a, the first input fiber 402 and the output fiber 404 comprise a pair of fibers. Each fiber has an approximately flat surface 411 and affixes to the other fiber at the approximately flat surface 411. The flat surface 411 may be, for example, a polished surface or cleaved surface. When the side polished fibers reduce the distance between their cores 408, 410, then the figure of merit decreases.

Referring to FIG. 4b, the input fiber 402 and the output fiber 404 comprise a pair of thermally expandable core (TEC) collimating fibers. The temperature changes in the thermally expandable core collimating fibers cause dopants to diffuse making the core 408, 410 and mode size larger. The larger mode size relative to the spacing of the cores accompanied by demagnification reduces the figure of merit. Alternatively, the input fiber 402 and the output fiber 404 may be a pair of sensor optical fibers having a fiber diameter of approximately 80 microns, 50 microns, or less.

Referring to FIG. 4c, the input fiber 402 and the output fiber 404 comprise a pair of fused fibers. Each fiber having a tapered cladding 417. The first core 408 of input fiber 402 positioned relative to the second core 410 of the output fiber 404. The fibers affixed together to achieve a core spacing that generates a figure of merit of less than two tenths. When the tapered fibers are affixed such that the cores are forced closer together that reduces the core spacing, which decreases the figure of merit.

Referring to FIG. 4d, the input fiber 402 and the output fiber 404 may be manufactured having offset cores 408, 410. The input fiber 402 and output fiber 404 may be affixed such that the cores 408, 410 of each fiber are closer to each other. Therefore, the overall effect is to make the core spacing between the input fiber 402 and the output fiber 404 less than 120 microns. For an embodiment the core spacing is 100 microns. For an embodiment the core spacing is 80 microns.

Figure 5A:
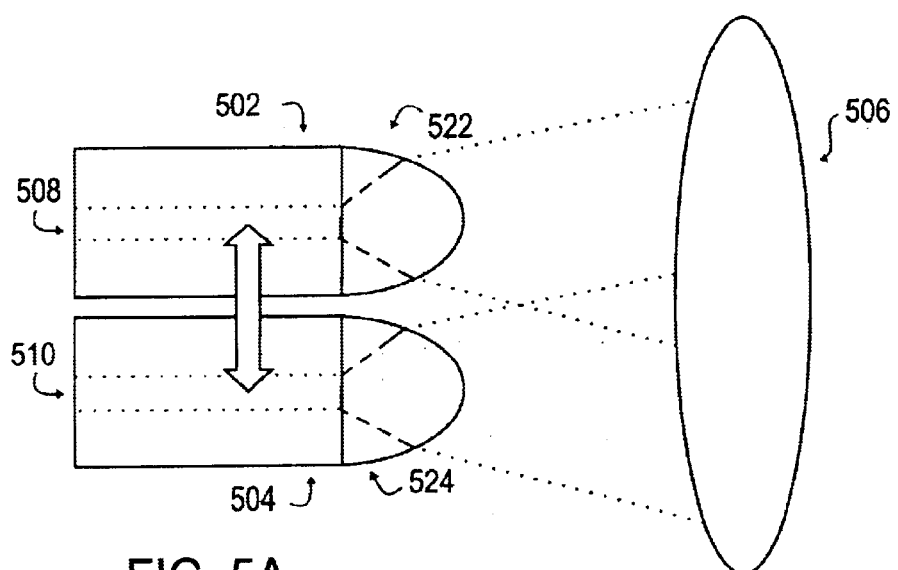
FIGS. 5a and 5b illustrate block diagrams of more alternative embodiments to affix the core spacing between the input fiber and the output fiber to less than 120 microns.
Figure 5B:
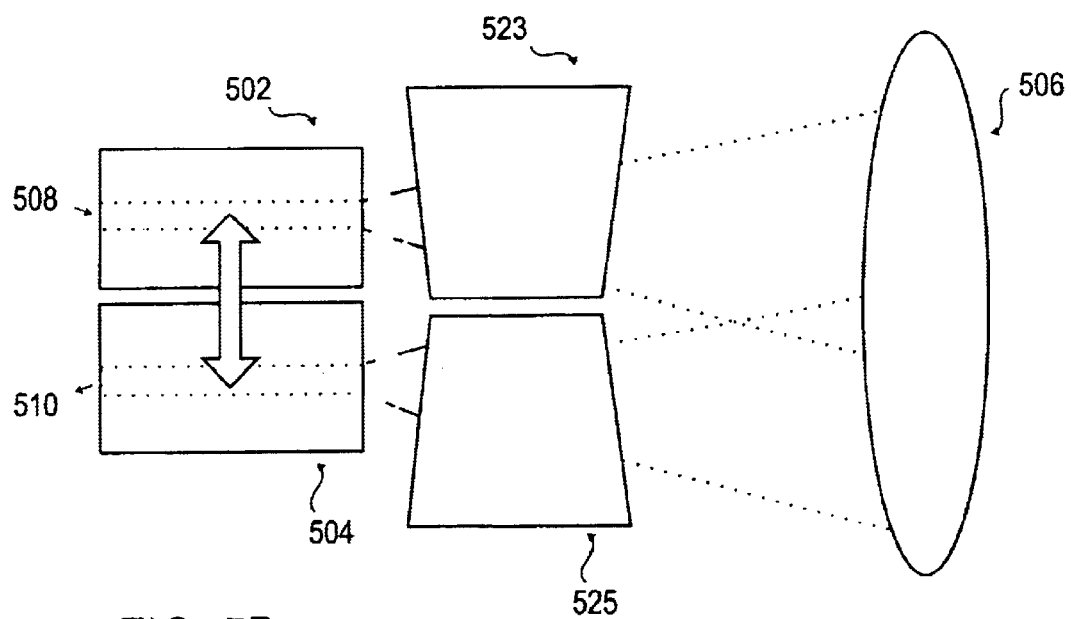

FIGS. 5a and 5b illustrate block diagrams of more alternative embodiments to affix the core spacing between the input fiber and the output fiber to less than 120 microns. The embodiments shown in FIGS. 4a–5b are only exemplary ways to reduce the figure of merit. Many alternatives are possible by looking at the formulas for the figure of merit to reduce the figure of merit.

Referring to FIG. 5a, a first micro lens couples to the output of the input fiber 502. The second micro lens couples to the input of the output fiber 504. The first microlens 522 focuses the light from the output of the input fiber 502 to expand the diameter of the spot of light relative to the spacing of the cores accompanied by demagnification in order to reduce the figure of merit. The microlens 522, 524 makes the mode size larger by magnifying the optical signal. The second micro 524 lens focuses the reflected beams of light into the input of the output fiber 204 to effectively reduce the average offset of the centers of the reflected spots. The microlens 522, 524 may be a standard micro lens, a grin lens, or any similar lens.

Referring to FIG. 5b, a first prism 523 interposes between the input fiber 502 and the lens 506. A second prism 525 interposes between the output fiber 504 and the lens 506. The first prism 523 and the second prism 525 have angled surfaces that are near the end of the each fiber 502, 504. The first prism refracts the light to make the core center 508 to appear closer to the core of the output fiber 510 in order to reduce the figure of merit. The second prism 525 refracts the reflected beams of light into the input of the output fiber 504 to effectively reduce the average offset of the centers of the reflected spots.

Figure 6:
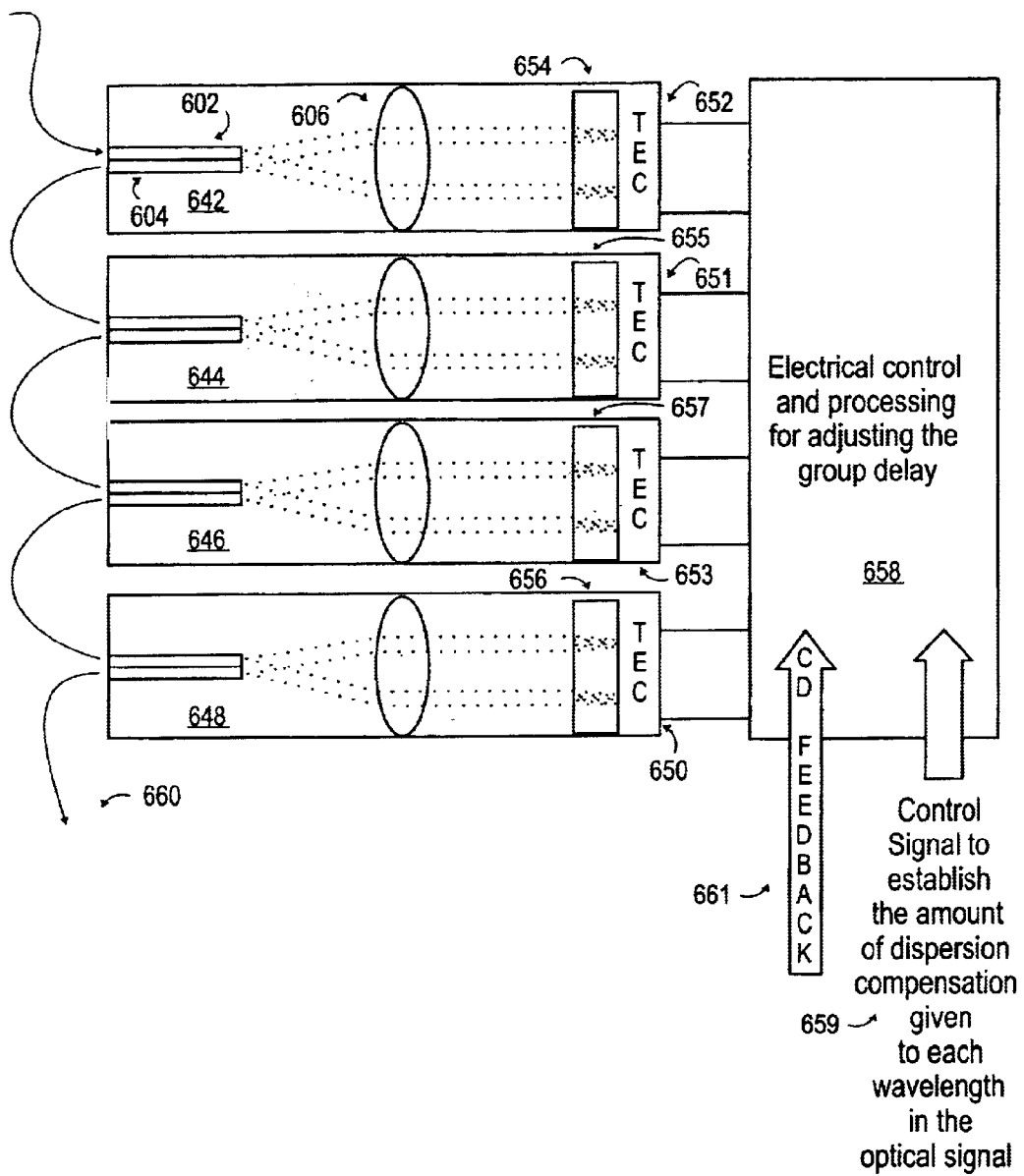
FIG. 6 illustrates a block diagram of an embodiment of a series of cascaded chromatic dispersion compensation modules to produce a group delay effect of inducing chromatic dispersion on each wavelength in the optical signal.

FIG. 6 illustrates a block diagram of an embodiment of a series of cascaded chromatic dispersion compensation modules to produce a group delay effect of inducing chromatic dispersion on each wavelength in the optical signal. A first chromatic dispersion compensation module 642 through a fourth chromatic dispersion compensation module 648 are connected in series. For an embodiment, each chromatic dispersion compensation module 642–648 has a temperature control device 650–653, such as a thermister heater, thermal electric cooler, etc., attached to that chromatic dispersion compensation module. A temperature control device 650–653 affixed to each etalon resonator 654–657 allows the electrical control and processing unit 658 to control the temperature of each etalon resonator 654–657 on an individual basis. By controlling the temperature of a particular etalon resonator, the temperature control device may adjust the refractive index of that etalon resonator, and thus, the center wavelength of that etalon resonator independent of any other etalon resonator.

Each chromatic dispersion compensation module, such as the first chromatic dispersion compensation module 642, also includes an input fiber 602 having a first core with a center, an output fiber 604 having a second core with a center, and a lens 606.

The series of etalon resonators 654–657 create an all pass filter whose group time delay for dispersion compensation can be tuned. The electrical control and processing unit 658 may send a separate signal to each etalon resonator to establish the total amount of dispersion compensation given to each wavelength in the optical signal. For an embodiment, the electrical control and processing unit 658 may receive that set point 659 from a network component. Also, if the collimated spot size is large enough from the lens 606 in the chromatic dispersion compensation module 642, then a small angle of reflection is generated for each reflected spot within the etalon resonator 654. The small angle of reflection from within the etalon resonator 654 can result in acceptably small insertion losses. Further, if the core spacing of the fibers 602, 604 is close enough, then the dispersion compensation induced into the optical signal can also result in acceptably small insertion losses. By making several chromatic dispersion compensation modules, such as cascading them in a series of temperature tunable resonators 654–657, the sum of the group delay responses when totaled together can generate different dispersion profiles for each wavelength in an optical signal. Each chromatic dispersion compensation module in the series of chromatic dispersion compensation modules 642–648 has a front reflector with a different reflectivity in order to optimize a flatter dispersion slope and a higher magnitude of dispersion induced on each wavelength per etalon resonator 654–657.

The output light 660 from the fourth chromatic dispersion compensation module 648 is sent to a chromatic dispersion feedback component 661 in order to hold or maintain a steady chromatic dispersion across all the wavelengths in the optical signal.

For an embodiment the chromatic dispersion compensation feedback component 661 may be a spectrum analyzer hooked up with a feedback loop into the electrical control and processing unit 658. For an embodiment, the variable optical path of each etalon resonator 654–657 is tuned to a center wavelength by solely changing temperature of that etalon resonator. For an embodiment, the temperature control device 650–653 maintains the temperature of the etalon resonator 654–657 above the ambient temperature.

As noted, the network control signal 659 may be fed to the electrical control and processing unit 658. The network control signal 659 sets the amount of desired dispersion compensation for each wavelength in the optical signal. The electrical control and processing unit 658 translates this information to send a temperature control signal to each individual temperature control device 650–653 in each respective chromatic dispersion compensation module 642–648.

For an embodiment, the center wavelength is tuned by one of the previously mentioned optical path adjusting methods.

As noted above, the reflectors in each etalon resonator 654–657 may be wavelength dependent to produce a dispersion slope compensation. For an embodiment, the dispersion slope compensation is the second derivative of the group delay. For an embodiment, each etalon in the series of etalon resonator 654–657 possesses a different reflectivity in order to optimize flatter dispersion slope and a higher magnitude of dispersion induced on each wavelength per etalon. Further, as described later, the dispersion slope compensation may be independent from the dispersion compensation given to each wavelength in the optical signal.

For an embodiment, each chromatic dispersion compensation module 642–648 has an operating wavelength range between five nanometers and one hundred nanometers. For an embodiment, the series of cascaded chromatic dispersion compensation module 642–648 has an operating wavelength range between five nanometers and one hundred nanometers. The series of cascaded chromatic dispersion compensation module 642–648 may be combined to form a single chromatic dispersion compensation module.

Figure 7:
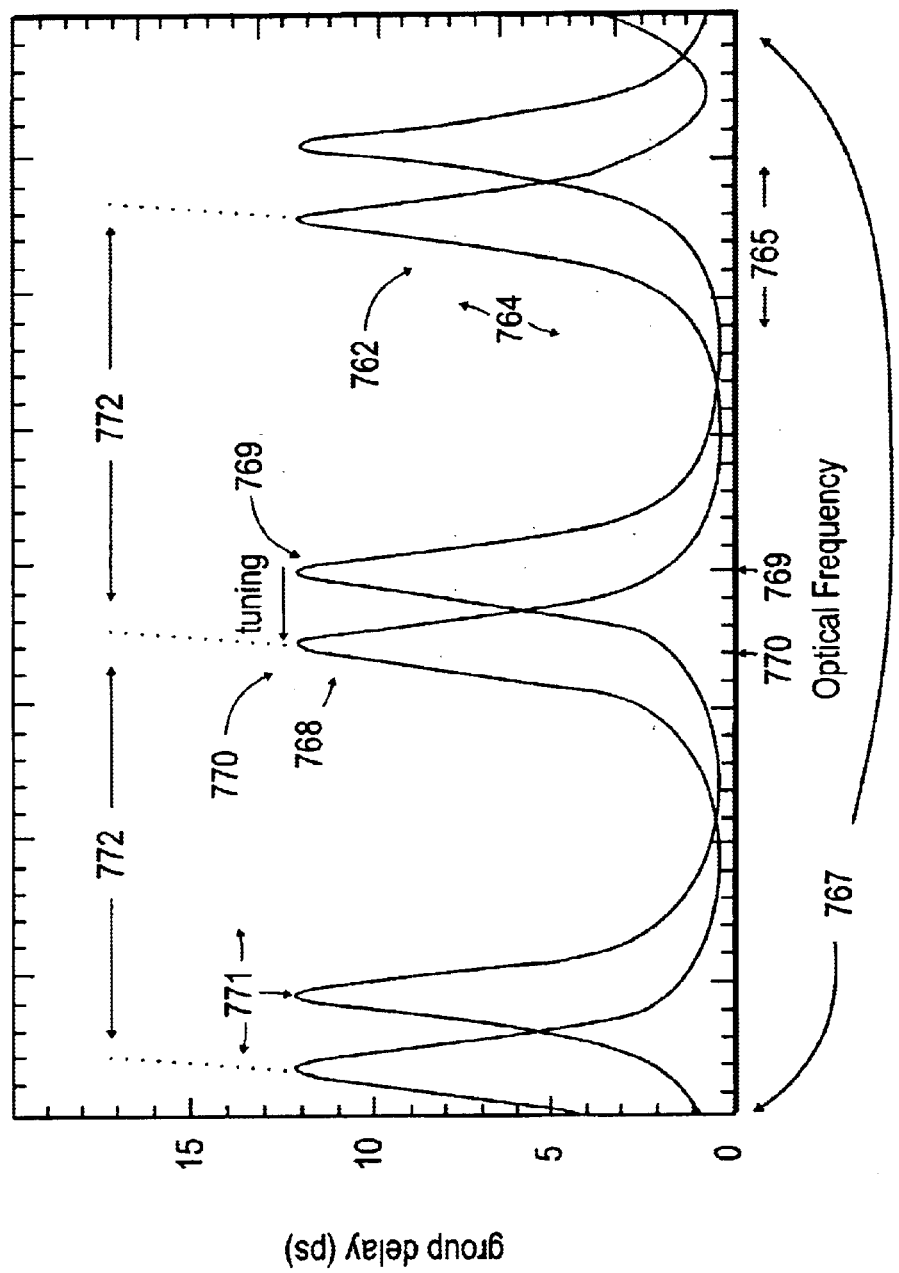
FIG. 7 illustrates a graph of exemplary dispersion compensation provided by an embodiment of a first set of etalons having a Free Spectral Range equal to a first value.

FIG. 7 illustrates a graph of exemplary dispersion compensation provided by an embodiment of a first set of etalons having a Free Spectral Range equal to a first value. For example, the dispersion compensation provided by four discrete chromatic dispersion compensators connected in series may be summed together to provide an approximately linear dispersion slope 762 and linear amount of dispersion compensation 764 provided to each wavelength 765 across the passband 767. Tuning the optical thickness of the etalon shifts this group delay 768 from a first wavelength 769 to a second wavelength 770. Thus, as described above, the group delay of a single etalon can be shifted in wavelength by changing the refractive index of that etalon. The exemplary induced group dispersion compensation from the series of etalons has a positive linear dispersion slope 762 and positive linear amount of dispersion compensation 764 provided to each wavelength 765 across the passband 767. The tuning of the dispersion slope 762 allows for variation of the amount of dispersion 764 induced on each wavelength 765 in a particular optical channel 771. In general, the tuning of the dispersion slope and amount of dispersion allows the dispersed pulse of light in that optical channel, slightly separated in time, to be synchronized back into a single narrow wavelength channel in the optical signal. This dispersion compensation response is repeated at the Free Spectral Range 772 of the etalons. For an embodiment, the Free Spectral Range of the etalons 772 may be chosen to be 50 GHz so that all optical channels on a 50 GHz ITU grid see the same amount of chromatic dispersion.

Various techniques may be used to make the tuning the slope of the dispersion compensation independent of the tuning of the amount of dispersion compensation induced across the passband.

Figure 8:
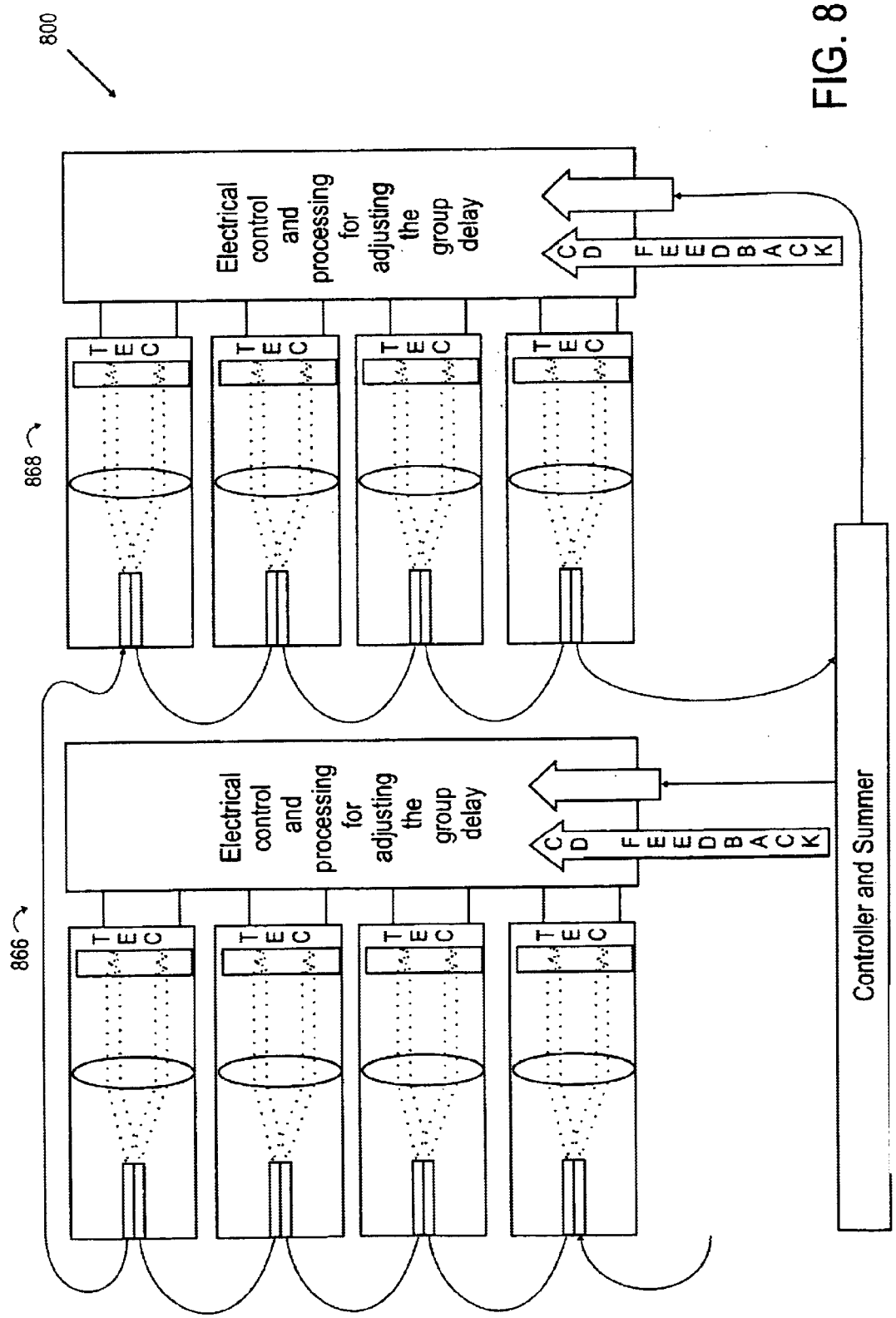
FIG. 8 illustrates a block diagram of an exemplary tunable chromatic

FIG. 8 illustrates a block diagram of an exemplary tunable chromatic dispersion compensator that allows for the independent tuning of the dispersion and dispersion slope across a passband of optical wavelengths. The tunable chromatic dispersion compensator 800 that allows for the independent tuning of the dispersion and dispersion slope across a passband of optical channels comprises a first set of etalons 866 and a second set of etalons 868 whose dispersion compensation are summed together. For an embodiment, the chromatic dispersion compensation modules 866, 868 connected in series may be any of the embodiments described above. Chromatic dispersion compensation modules 866, 868 connected in series to form a set of etalons may not have input and output fiber having core centers spaced less than one hundred and twenty microns apart.

FIG. 9 illustrates a graph of an exemplary passband of wavelengths and induced dispersion compensation generated by both the first set of etalons and the second set of etalons. The first set of etalons has a Free Spectral Range equal to a first value, such as 50 GHz to create a dispersion 968 over a first passband 967 of optical wavelengths, such as the passband of one or more optical channels in the C-band. The second set of etalons has a Free Spectral Range offset from the first value, such as 50.1 GHz. The second set of etalons has a second passband 969 of optical wavelengths that is greater in bandwidth than the band of optical wavelengths in the first passband 967. The second set of etalons creates a linear dispersion 970 over the second passband 969 and the linear dispersion associated with the second set of etalons is substantially opposite in slope to the linear dispersion 968 created by the first set of etalons.

The all pass etalons connected in series previously described may be used to implement this technique of tuning dispersion compensation to a passband of wavelengths independent of the tuning of the slope of the dispersion compensation applied to the passband of wavelengths. The chromatic dispersion compensation module formed from two sets of cascaded all-pass resonators allows independently tunable dispersion and tunable dispersion slope across the entire band of Wavelength Division Multiplexed channels in the C-band.

The passband 967 may be the range of optical frequencies 965 over which the dispersion 968 should be generated. The passband 967 may be determined by the frequency spread of each WDM channel.

Referring to FIG. 8, the first set of etalons 966 has a Free Spectral Range equal to the channel spacing to create a linear dispersion over the passband. The second set of etalons 968 has a Free Spectral Range slightly offset from the channel spacing and an extended-passband to create a linear dispersion over the extended-passband.

Referring to FIG. 9, an extended-passband 969 may be a one and half times greater in bandwidth than the range of optical frequencies in the passband 967. For example, a passband 969 may be 0.020 THz to accommodate 10 Gbps channels. An extended-passband 969 might be 0.030 THz and have substantially the opposite slope in dispersion 968 to that created by the first set of etalons over the channel passband (e.g., 0.020 THz).

FIG. 10 illustrates a graph of two exemplary linear dispersion curves with substantially opposite slopes generated by a first set of etalons having a passband of wavelengths equal to a first bandwidth and a second set of etalons having an extended-passband greater in bandwidth than the passband. Dispersion curve-d1 1070 is the dispersion compensation provided by the second set of etalons to the wavelengths within the extended-passband 1069. Dispersion curve-d2 1068 is the dispersion compensation provided by the first set of etalons to the wavelengths within the passband 1067.

The first set of etalons generates a first amount of dispersion compensation 1064a induced into a first optical channel of wavelengths 1071. The first set of etalons generates a negative slope of dispersion 1062a induced into each wavelength in a first optical channel 1071. The negative dispersion slope 1062 and negative amount of dispersion compensation 1064a provided to each wavelength across the passband 1067 of the first optical channel 1071 is repeated at a free spectral range 1072 equal to the channel spacing. For an embodiment, the second set of etalons with a Free Spectral Range has an offset value 1074 set below the free spectral range 1072 equal to the channel spacing in order to generate a positive slope of the total dispersion compensation 1075 across the first passband 1067.

The second set of etalons generates a second amount of dispersion 1070 induced into the first optical channel of wavelengths 1071. The second set of etalons generates a positive slope of dispersion 1062b induced into each wavelength in a first optical channel 1071. The positive dispersion slope 1062b and positive amount of dispersion compensation 1064b provided to each wavelength across the extended-passband 1069 is repeated at a free spectral range offset below the channel spacing 1074. Thus, the amount of positive dispersion compensation 1064b induced to the wavelengths in the second optical channel 1072 increases. Note, the second set of etalon's repeated dispersion compensation-d1 1070 over the extended-passband 1069 and offset 1074 below the FSR of the first set of etalons appears on the graph as a shifting left. The amount of positive dispersion compensation 1064b induced to the wavelengths in the third optical channel 1073 increases even more than those in the second optical channel 1072.

Line-A 1075 represents the mean summation of the dispersion curves 1068,1070 generated from the first set of etalons and the second set of etalons. Thus, Line-A 1075 represents the total amount of dispersion compensation 1064c induced on each optical channel 1071, 1072, 1073 as well as the slope of dispersion 1062c induced across the passband of all the channels. In this example, Line-A 1075 represents that a positive amount of dispersion compensation 1064c and positive slope of dispersion 1062c has induced been into the optical signal.

Thus, the two linear dispersion curves 1068, 1070 with opposite slopes 1062a, 1062b are added to produce a dispersion compensation 1064c that varies dispersion across the passband of all the channels 1071,1072,1073. For an embodiment, by offsetting the Free Spectral Range 1074 of one of these dispersion curves from the channel spacing, a dispersion slope 1062c proportional to the slope 1062a, 1062b of these dispersion curves can be generated.

For an embodiment, the first set of etalons creates a dispersion given by:

$$d_1(f) \approx a + b(f - f_0) \ (f_0 - EPB/2) < f < (f_0 - EPB/2).$$

The dispersion of the second set of etalons is given by:

$$d_2(f) \approx c + b(f - f_0) \ (f_0 - PB/2) < f < (f_0 - PB/2).$$

The dispersion is given by summing the linear cures of both sets of etalons may be:

$$d(f) = d_1(f) + d_2(f) \approx a + c \ (f_0 - PB/2) < f < (f_0 - PB/2).$$

In the above formulas: d1 is the dispersion compensation provided by the first set of etalons to the wavelengths within the passband; d2 is the dispersion compensation provided by the second set of etalons to the wavelengths within the passband; EPB is the extended-passband; PB is the designed passband; $f_0$ is the center frequency of WDM center channel (channel 0) in the band; f is the frequency of any particular wavelength under analysis in the wavelengths contained the passband; b is the slope of the dispersion curve for a given set of etalons; a is the mean value of the dispersion compensation across the optical channel from the first set of etalons; and c is the mean value of the dispersion compensation across the optical channel from the second set of etalons. d is the summed value of approximately a plus c.

Also, the two linear dispersion curves with opposite dispersion slopes may be added to produce an approximately constant total amount dispersion compensation for each optical channel. If the Free Spectral Ranges of each set of etalons matches the channel spacing, then each channel would see this same dispersion. Note this will be illustrated in FIG. 11. However, if the FSR of the second set of etalons (but not the first set) is slightly offset from the channel spacing by a delta frequency, then the dispersion at each channel increases or decreases depending on the value of the FSR offset. Assume that the FSR of the first set of etalon is, for example, 50.0 GHz. When the FSR of the second set of etalons is offset below the FSR of the first set of etalon, such as 49.9 GHz, then the slope of the dispersion across passband is positive. When the FSR of the second set of etalons is offset above the FSR of the first set of etalon, such as 50.1 GHz, then the slope of the dispersion across passband is negative. The tuning of the slope of the dispersion compensation across passband is independent from the tuning of the mean amount of dispersion compensation provided to the channels in the optical signal. For an embodiment, as noted above, the optical path of each etalon may be adjusted to determine the amount of dispersion compensation provided to optical channels in the optical signal.

FIG. 11 illustrates a graph of an exemplary dispersion compensation versus optical frequency generated by an embodiment of a tunable chromatic dispersion compensator where the free spectral range of the second set of etalons and the first set of etalons differ but the dispersion slope is approximately zero. The exemplary passband 1167 is repeated at a free spectral range to include three wavelength channels, the center wavelength channel, channel-0 1172, a Channel-minus N 1171 one or more WDM wavelength channels below channel 0, and Channel-positive N 1173 the same number of WDM wavelength channels above channel 0. The FSR of the first set of etalons is equal to the channel spacing. The FSR offset 1174 of the second set of etalons is slightly smaller than the channel spacing so that the N channels from the center channel 1172, the dispersion curve-d1 1170 is offset from the center of the channel by delta frequency. However, because the dispersion curve-d1 1170 and curve-d2 1168 are flat (slope=0 for both curves), the ±Nth channels have the same dispersion as channel 0. The dispersion 1170 provided by the first set of etalons is added to the dispersion 1168 provided by the second set of etalons. Thus, the value of the combined dispersion compensation 1075, represented by line-B, induced to a particular optical frequency channel is the same in all three channels 1171–1173.

FIG. 12 illustrates a graph of exemplary dispersion curves where the second set of etalons with a Free Spectral Range has an offset value set above the first value to generate a negative slope of the dispersion compensation across the first passband. The amount of the total dispersion compensation 1275 provided to a particular optical frequency channel differs for each optical channel, represented by line-C. The second set of etalons provides a dispersion curve 1270 with a positive dispersion compensation and slope of dispersion compensation across the extended-passband. The first set of etalons provides a dispersion curve 1268 with a negative dispersion compensation and slope of dispersion compensation across the pass band.

The ±Nth channels 1271, 1273 have differing amounts of summed mean dispersion compensation 1275 provided to that channel than value of the dispersion compensation provided to optical channel-0 1272. The ±Nth channels 1271, 1273 have differing amounts of summed mean dispersion compensation 1275 because the offset of the free spectral range of second set of etalons is set above the free spectral range of the first set of etalons. For example, because the free spectral range of the second set of etalons, such as 50.1 GHz, was selected to be higher than the free spectral range of the first set of etalons, such as 50.0 GHz, the value of the dispersion compensation provided to each channel decreases from the minus N optical channel to the positive N optical channel.

The slope of the summed dispersion compensation, 1275 can be adjusted by altering the slope of either dispersion curve-d1 1270 or curve-d2 1268. The slope of line C 1275 is separate from the average total dispersion compensation induced across the passband which is controlled by the mean value of dispersion provided by curve-d1 1270 and curve-d2 1268.

For an embodiment, 40 channels may exist to the positive of the center optical channel 1272. Forty channels may exist to the negative of the center optical channel 1272. An exemplary center frequency of WDM center channel 1272 (channel 0) may be 193.3 THz. As noted above, the passband may be designed range of wavelengths the chromatic dispersion compensation module is intended to pass. The passband may be the wavelengths in a specific optical band such as the C-band, 1530 nm to 1565 nm.

The dispersion curves at the $N^{th}$ neighboring is given by:

$$d_1(f) \approx a + b(f - f_N - N\Delta f) \ (f_N - PB/2) < f < (f_N - PB/2)$$
$$d_2(f) \approx c - b(f - f_N) \ (f_N - PB/2) < f < (f_N - PB/2)$$
$$d(f) = d_1(f) + d_2(f) \approx a + c - N\Delta fb \ (f_N - PB/2) < f < (f_N - PB/2)$$

where $f_n$ is the center frequency of the $N_{th}$ channel from the center channel at $f_0$.

Therefore, the dispersion slope is given by $$\text{dispersion slope} = b\left(\frac{\Delta f}{50 \text{ GHz}}\right).$$

The tunable chromatic dispersion compensation module may consist of both the first set of etalons and the second set of etalons. The first set of etalons has a Free Spectral Range equal to a first value. The first set of etalons creates a dispersion over a first passband of optical wavelengths. The second set of etalons has a Free Spectral Range offset from the first value. The second set of etalons also creates a dispersion over the first passband of optical wavelengths. The dispersion induced on the optical wavelengths from the first set of etalons and the second set of etalons to be summed to adjust a slope of the dispersion across the first passband. The generated slope is independent of a total amount of dispersion compensation induced across the first passband. Even though the both sets of etalons have the passband, when the dispersion amounts are summed a slope will be generated because the first set of etalons has a different Free Spectral Range then the Free Spectral Range associated with the second set of etalons. The generated slope is independent of a total amount of dispersion compensation induced across the first passband.

For example, the d1 curve for the second set of etalons 1270 will appear to be shifting left with respect to the optical channel spacing 1271, 1272, 1273 due to its Free Spectral Range being different than the channel spacing Free Spectral Range. Also, the d2 curve for the first set of etalons 1268 will appear to be shifting right with respect to the optical channel spacing 1271, 1272, 1273 due to its Free Spectral Range being different than the channel spacing Free Spectral Range. The slope of the dispersion curve generated from the summed dispersion curves of the sets of etalons yields a slope that is independent of a total amount of dispersion compensation induced across the first passband.

FIG. 13 illustrates a graph of an exemplary dispersion compensation versus optical frequency generated by an embodiment of a tunable chromatic dispersion compensator that allows for the independent tuning of the total amount of dispersion compensation and the slope of the dispersion across a passband of optical channels. Vertically, the graph plots dispersion compensation 1380 in picoseconds per nanometer provided to optical wavelengths 1382. Horizontally the graph plots optical wavelengths 1382 measured in Terahertz. The graph plots dispersion compensation 1380 vertically from minus 500 picoseconds per nanometer to positive 500 picoseconds per nanometer. The graph plots optical wavelengths 1382 horizontally from 191.00 THz to 195.60 THz.

Plotted lines A, B, and C represent different states of the exemplary chromatic dispersion compensation device. The plotted lines represent the group delay dispersion compensation and dispersion slope across a passband of optical channels. For example, the chromatic dispersion compensation module previously described in FIG. 10 could adjust the free spectral range offset or the slope of the dispersion curves to generate a positive slope represented in plotted line A. As illustrated in plotted lines A2 and A3, the variable optical path in the etalon resonators of either sets of etalons may be adjusted to raise/lower the total amount of dispersion compensation induced to each channel across the passband independent of the tuning of the slope of dispersion for those channels.

A chromatic dispersion compensation module previously described in FIG. 11 may adjust the free spectral range offset or the slope of the dispersion curves to generate a flat slope represented in plotted line B. As illustrated in plotted lines B2 and B3, variable optical path in the etalon resonators of either sets of etalons may be adjusted to raise/lower the amount of dispersion compensation induced to each channel across the passband independent of the tuning of the slope of dispersion for those channels.

A chromatic dispersion compensation module previously described in FIG. 12 adjusts the free spectral range offset or the slope of the dispersion curves to generate a negative slope represented in plotted line C. As illustrated in plotted lines C2 and C3, variable optical path in the etalon resonators of either sets of etalons may be adjusted to raise/lower the amount of dispersion compensation induced to each channel across the passband independent of the tuning of the slope of dispersion for those channels.

FIG. 14 illustrates a flow chart of an embodiment of a method to adjust total amount of dispersion compensation induced in an optical signal independent of the dispersion slope induced in the optical signal.

In block 1402, the chromatic dispersion compensation module induces a first amount of dispersion compensation in a first passband of optical wavelengths at a Free Spectral Range equal to a first value. In block 1404, the chromatic dispersion compensation module induces a second amount of dispersion compensation in a second passband of optical wavelengths at a Free Spectral Range offset from the first value. The second passband of optical wavelengths is greater in bandwidth than the band of optical wavelengths in the first passband.

In block 1406, the chromatic dispersion compensation module tunes the slope of the dispersion compensation across the first passband by adjusting variables such as free spectral range or the slope of the dispersion curves generated by each set of etalons. In block 1408, the chromatic dispersion compensation module tunes the amount of dispersion compensation across the first passband by adjusting variables such as refractive index, reflectivity, of each set of etalons, etc.

In block 1410, the chromatic dispersion compensation module may generate a linear dispersion over the second passband. The chromatic dispersion compensation module may generate a linear dispersion over the first passband. The second linear dispersion being substantially opposite in slope to that created by the first linear dispersion.

In block 1412, the chromatic dispersion compensation module sums the second dispersion curve with the first dispersion curve to generate a tunable dispersion compensation induced to a passband of optical channels independently from tuning of the dispersion slope applied across the passband of optical channels.

Note, the specific numeric reference should not be interpreted as a literal sequential order but rather interpreted that the first core is different than a second core. Thus, the specific details set forth are merely exemplary.

In the forgoing specification, the invention has been described with reference to specific exemplary embodiments thereof. It will, however, be evident that various modifications and changes may be made thereto without departing from the broader spirit and scope of the invention as set fourth in the appended claims. The specification and drawings are, accordingly, to be regarded in an illustration rather then a restrictive sense.

We claim:

1. An apparatus, comprising:

a chromatic dispersion compensation module that includes an input fiber having a first core with a center;

an output fiber having a second core with a center, the input fiber is adjacent to the output fiber, spacing between the center of the first core and the center of the second core is affixed to less than one hundred and twenty microns;

a lens, the input fiber to route an optical signal to the lens;

an etalon resonator having reflectors with fixed reflectivity and a variable optical length to induce a wavelength-dependent delay into the optical signal, the lens to route the optical signal to the etalon resonator; the etalon resonator to route the optical signal to the output fiber through the lens; and two or more chromatic dispersion compensation modules cascadedly connected together.

2. The apparatus of claim 1, wherein the lens is a collimating lens.

3. The apparatus of claim 1, wherein the lens is approximately a focal length away from an output of the input fiber.

4. The apparatus of claim 1, wherein the input fiber and the output fiber comprise a pair of fibers, each fiber having an approximately flat surface and affixed to the other fiber at the approximately flat surface.

5. The apparatus of claim 1, wherein the input fiber and the output fiber comprise a pair of thermally expandable core (TEC) collimating fibers.

6. The apparatus of claim 1, further comprising:

a first micro lens coupled to an output of the input fiber; and a second micro lens coupled to an input of the output fiber.

7. The apparatus of claim 1, further comprising:

a first prism interposed between the input fiber and the lens; and a second prism interposed between the output fiber and the lens.

8. The apparatus of claim 1, wherein the spacing between the center of the first core and the center of the second core is affixed to a value between the range of fifty to one hundred and twenty microns.

9. The apparatus of claim 1, wherein the input fiber and the output fiber comprise a pair of fused fibers, each fiber having a tapered cladding, the first core of the input fiber positioned relative to the second core of the output fiber to possess a figure of merit of less than two tenths.

10. The apparatus of claim 1, wherein the variable optical path of the etalon resonator is tuned to a center wavelength by solely changing temperature of that etalon resonator.

11. The apparatus of claim 1, wherein the variable optical path of the etalon resonator is tuned to a center wavelength by solely changing strain on that etalon resonator.

12. The apparatus of claim 1, wherein the variable optical path of the etalon resonator is tuned to a center wavelength by solely changing spacing between a front reflector and a back reflector of the etalon resonator.

13. The apparatus of claim 1, wherein the chromatic dispersion compensation module has an operating wavelength range greater than twenty nanometers.

14. The apparatus of claim 1, wherein the chromatic dispersion compensation module has a figure of merit ratio of less than one tenth.

15. The apparatus of claim 1, wherein the chromatic dispersion compensation module has a figure of merit ratio of less than five one hundredths.

16. An apparatus Tho apparatus of claim 1, comprising:
a chromatic dispersion compensation module that includes
an input fiber having a first core with a center;
an output fiber having a second core with a center, the input fiber is adjacent to the output fiber, spacing between the center of the first core and the center of the second core is affixed to less than one hundred and twenty microns;
a lens, the input fiber to route an optical signal to the lens;
an etalon resonator having reflectors with fixed reflectivity and a variable optical length to induce a wavelength-dependent delay into the optical signal, the lens to route the optical signal to the etalon resonator: the etalon resonator to route the optical signal to the output fiber through the lens, wherein each etalon resonator connects to a temperature control device.

17. The apparatus of claim 16, wherein the reflectors include a front reflector having a fixed reflectively between two and sixty percent.

18. The apparatus of claim 16, wherein the chromatic dispersion compensation modulo has an operating wavelength range greater than twenty nanometers.

19. The apparatus of claim 16, wherein the input fiber and the output fiber comprise a pair of fibers, each fiber having an approximately flat surface and affixed to the other fiber at the approximately flat surface.

20. An apparatus comprising:
a chromatic dispersion compensation module that includes
an input fiber;
an output fiber, the input fiber adjacent to the output fiber;
a lens, the input fiber to route an optical signal to the lens;
a first etalon resonator having reflectors with wavelength-dependent reflectivity and a variable optical length to induce a wavelength-dependent delay into the optical signal, the lens to route the optical signal to the first etalon resonator; the first etalon resonator to route the optical signal to the output fiber through the lens; and
a temperature control device affixed to the first etalon resonator to control temperature of the first etalon resonator independent of any other etalon resonator; and a series of cascadedly connected etalon resonators, wherein each etalon resonator in the series of etalon resonators has a front reflector with a different reflectivity in order to optimize a flatter dispersion slope and a higher magnitude of dispersion induced on each wavelength per etalon.

21. The apparatus of claim 20, wherein at least one of the reflectors with wavelength dependent reflectivity comprises a fiber Bragg grating.

22. The apparatus of claim 20, wherein at least one of the reflectors wavelength dependant reflectivity comprises a mirror having dielectric layers that produce a wavelength dependant response.

23. The apparatus of claim 20, wherein the temperature control device maintains temperature of the first etalon resonator above ambient temperature.

24. The apparatus of claim 20, wherein
the input fiber has a first core with a center;
the output fiber has a second core with a center, the input fiber is adjacent to the output fiber, spacing between the center of the first core and the center of the second core is affixed to less than one hundred and twenty microns.

25. The apparatus of claim 20, wherein the reflectors include a front reflector having a wavelength dependant reflectivity between two and sixty percent.

26. An system, comprising:
a series of cascaded chromatic dispersion compensation modules, a first chromatic dispersion compensation module that includes
an input fiber having a first core with a center;
an output fiber having a second core with a center, the input fiber adjacent to the output fiber, spacing between the center of the first core and the center of the second core is affixed to less than one hundred and twenty microns;
a lens, the input fiber to route an optical signal to the lens; and
a first etalon resonator having reflectors with fixed reflectivity and a variable optical length to induce a wavelength-dependent delay into the optical signal, the lens to route the optical signal to the first etalon resonator; the first etalon resonator to route the optical signal to the output fiber through the lens.

27. The system of claim 26, further comprising:
a temperature control device affixed to the first etalon resonator to control temperature of the first etalon resonator independent of any other etalon resonator.

28. The system of claim 26, wherein at least two or more etalon resonators in the series of chromatic dispersion compensation modules has a front reflector with a different reflectivity in order to optimize a flatter dispersion slope and a higher magnitude of dispersion induced on each wavelength per etalon.

29. The system of claim 26, wherein the series of cascaded chromatic dispersion compensation modules includes a first set of etalon resonators and a second set of etalon resonators to adjust a slope of the dispersion compensation across a passband of wavelengths independently of a total amount of dispersion compensation induced across the passband of wavelengths.

30. An apparatus, comprising:
means for inducing wavelength-dependent delays in to an optical signal;
means for collimating the optical signal;

means for routing the optical signal through a series of an etalon resonators in a first chromatic dispersion module;

means for tuning the resonant center wavelength of the etalon resonator by adjusting optical path length of the etalon resonator;

means for routing, via a non-normal angle of incidence, the optical signal to an output, wherein the non-normal angle of incidence incurs a figure of merit of less than two tenths; and means for routine the optical signal through a second chromatic dispersion module in series with the first chromatic dispersion module.

31. The apparatus of claim 30, further comprising:

means for adjusting an optical path length of the etalon resonator while maintaining the fixed reflectivity of reflectors in that etalon resonator.

* * * * *